(12) United States Patent
Benbrahim et al.

(10) Patent No.: US 7,480,857 B2
(45) Date of Patent: Jan. 20, 2009

(54) METHOD AND APPARATUS FOR DATA COMMUNICATION IN A GAMING SYSTEM

(75) Inventors: Jamal Benbrahim, Reno, NV (US); Daryn G. Kiely, Henderson, NV (US); Derrick Price, Las Vegas, NV (US)

(73) Assignee: IGT, Reno, NV (US)

(*) Notice: Subject to any disclaimer, the term of this patent is extended or adjusted under 35 U.S.C. 154(b) by 496 days.

(21) Appl. No.: 10/938,293

(22) Filed: Sep. 10, 2004

(65) Prior Publication Data

US 2006/0059421 A1 Mar. 16, 2006

(51) Int. Cl.
*G06F 17/00* (2006.01)

(52) U.S. Cl. .......................................... 715/234; 463/1

(58) Field of Classification Search ................. 715/513, 715/234; 463/30, 1
See application file for complete search history.

(56) References Cited

U.S. PATENT DOCUMENTS

| | | | | |
|---|---|---|---|---|
| 6,694,433 | B1* | 2/2004 | Kolouch | 705/36 R |
| 6,918,039 | B1* | 7/2005 | Hind et al. | 726/3 |
| 7,035,925 | B1* | 4/2006 | Nareddy et al. | 709/224 |
| 2002/0111133 | A1* | 8/2002 | Wittkotter | 455/1 |
| 2003/0018661 | A1* | 1/2003 | Darugar | 707/500 |
| 2003/0105950 | A1* | 6/2003 | Hirano et al. | 713/100 |
| 2003/0135489 | A1* | 7/2003 | Goodwin et al. | 707/3 |
| 2003/0149934 | A1 | 8/2003 | Worden | |
| 2003/0171149 | A1* | 9/2003 | Rothschild | 463/42 |
| 2004/0068509 | A1* | 4/2004 | Garden et al. | 707/100 |
| 2004/0171423 | A1 | 9/2004 | Silva et al. | |
| 2006/0015944 | A1* | 1/2006 | Fields | 726/27 |
| 2006/0265689 | A1* | 11/2006 | Kuznetsov et al. | 717/117 |

FOREIGN PATENT DOCUMENTS

| | | |
|---|---|---|
| EP | 1109117 | 6/2001 |
| WO | WO 01/67289 | 9/2001 |
| WO | WO 2004/072865 | 8/2004 |

OTHER PUBLICATIONS

Buscaldi, Davide, et al, "Invited Workshop on Conceptual Information Retrieval and Clustering of Documents: Tag Semantics for the Retrieval of XML Documents", Proceedings of the 1st International Symposium on Information and Communication Technologies ISICT '03, Sep. 2003, pp. 273-278.*

(Continued)

*Primary Examiner*—Laurie Ries
(74) *Attorney, Agent, or Firm*—Weaver Austin Villeneuve & Sampson LLP

(57) ABSTRACT

In a method for configuring a first computing device to send or receive formatted data is provided, wherein the formatted data includes a plurality of formatting tags, an indication of a set of formatting tags recognized by a second computing device may be received via a network. A mapping of identifiers to formatting tags in the set of formatting tags may be determined. At least one of an encoder, a decoder, and a parser of the first computing device may be configured with the mapping.

46 Claims, 20 Drawing Sheets

OTHER PUBLICATIONS

W3C Recommendation, XSL Transformations (XSLT) Version 1.0, downloaded from http://www.w3.org/TR/xslt, Nov. 16, 1999, pp. 1-102.*

International Search Report dated Feb. 21, 2006, from corresponding International Application No. PCT/US2005/032251, 5 pp. including Notification of Transmittal.

Written Opinion of the International Searching Authority, dated Feb. 21, 2006, from corresponding International Application No. PCT/US2005/032251, 5 pp.

Wustner, E. et al., "Converting Business Documents: A Classification of Problems and Solutions Using XML/XSLT", Advanced Issues of E-Commerce and Web-based Information Systems (WECWIS 2002) Proceedings, Fourth IEEE International Workshop on Jun. 26-28, 2002, pp. 54-61.

* cited by examiner

METHOD AND APPARATUS FOR DATA COMMUNICATION IN A GAMING SYSTEM

BACKGROUND

The present disclosure is generally related to gaming systems, and in particular to data communication in a gaming system.

A typical casino gaming system may include a plurality of gaming machines communicatively connected to a server or workstation via a network. The gaming machines may exchange data with the server and/or with other gaming machines via the network. For example, the gaming machines may send data to the server relating to the operation of the gaming units. Such data may include the dollar amount and number of wagers being made on each of the gaming machines and data indicative of how much each of the gaming machines is paying out in winnings.

Techniques for sharing data via networks in a consistent way have been developed. For example, various languages and standards for exchanging formatted data currently exist such as the Hypertext Markup Language (HTML) and the Extensible Markup Language (XML). In HTML and XML, the formatted data includes formatting information that may indicate, for example, how data is to be displayed, how data is to be printed via a printer, how a person or computing system may interact with the data, what type of data is included, etc. In particular, the formatted data includes formatting symbols ("tags") that convey the formatting information.

An example of data formatted according to XML is provided below:

<first-name>George</first-name>
<last-name>Costanza</last-name>

In this example, the data itself comprises the text "George Costanza." The formatting tags "<first-name>" and "</first-name>" bracket the text "George" indicating that it is a person's first name. Similarly, the formatting tags "<last-name>" and "</last-name>" bracket the text "Costanza" indicating that it is a last name. Another example of data formatted according to XML is:

<first-name age="37">George</first-name>
<last-name>Costanza</last-name>

In this example, "age" is an attribute associated with the formatting tag "<first-name>", and the attribute "age" indicates that the person is 37 years old.

As can be seen in these examples, a majority of the text in the formatted data comprises formatting tags and attributes. Thus, with large amounts of data, formatting information may add significantly to the size of the data, and more storage, longer transmission times, more communication capacity, etc., may be needed as a result.

Further techniques have been developed to reduce the size of data formatted according to XML. For example, one technique involves encoding formatting tags in the formatted data into binary representations of the tags. The binary representations of the tags are much smaller in size than the formatting tags themselves and thus memory and/or bandwidth requirements may be reduced.

SUMMARY

In one aspect, a method for configuring a first computing device to send or receive formatted data is provided, wherein the formatted data includes a plurality of formatting tags. The method may comprise receiving via a network an indication of a set of formatting tags recognized by a second computing device, and determining a first mapping, the first mapping comprising a mapping of identifiers to formatting tags in the set of formatting tags. The method may also comprise configuring at least one of an encoder, a decoder, and a parser of the first computing device with the first mapping.

In another aspect, a method for setting up a communication of formatted data between a first computing device and a second computing device is provided, wherein the formatted data includes a plurality of formatting tags. The method may comprise receiving via a network an indication of a set of encrypted versions of formatting tags recognized by the second computing device, and determining a first mapping, the first mapping comprising a mapping of identifiers to formatting tags corresponding to the set of encrypted versions of formatting tags recognized by the second computing device. Additionally, the method may comprise configuring at least one of an encoder, a decoder, and a parser of the first computing device with the first mapping.

In yet another aspect, a gaming system apparatus is provided. The gaming system apparatus may include a network interface device to communicatively couple to a plurality of gaming machines via a communication link, and a controller operatively coupled to the network interface device. The controller may comprise a processor, and a memory operatively coupled to the processor. The controller may also comprise a negotiator to receive via the communication link an indication of a set of formatting tags recognized by a computing device separate from the gaming apparatus, and a mapping determiner to determine a mapping of identifiers to formatting tags in the set of formatting tags. Additionally, the controller may comprise at least one of an encoder capable of being configured to encode formatted data based on the mapping, a decoder capable of being configured to decode encoded formatted data based on the mapping, and a parser capable of being configured to parse encoded formatted data based on the mapping.

In still another aspect, another gaming system apparatus is provided. The gaming system apparatus may include a network interface device to communicatively couple to a plurality of gaming machines via a communication link, and a controller operatively coupled to the network interface device. The controller may comprise a processor, and a memory operatively coupled to the processor, the controller may further comprise a negotiator to receive via the communication link a set of encrypted versions of formatting tags recognized by a computing device separate from the gaming apparatus, and a mapping determiner to determine a first mapping based on the set of encrypted versions of formatting tags recognized by the separate computing device, the first mapping comprising a mapping of identifiers to formatting tags corresponding to the set of encrypted versions of formatting tags. The controller additionally may comprise at least one of an encoder capable of being configured to encode formatted data based on the first mapping, a decoder capable of being configured to decode encoded formatted data based on the first mapping, and a parser capable of being configured to parse encoded formatted data based on the first mapping.

In another aspect, a method for configuring a first computing device to send or receive formatted data is provided, wherein the formatted data includes a plurality of formatting tags. The method may comprise transmitting to a second computing device via a network an indication of a set of formatting tags recognized by the first computing device, and determining a first mapping, the first mapping comprising a mapping of identifiers to formatting tags in the set of formatting tags. Also, the method may comprise configuring at least one of an encoder and a decoder of the first computing device with the first mapping.

In yet another aspect, a method for setting up a communication of formatted data between a first computing device and a second computing device is provided, wherein the formatted data may include a plurality of formatting tags. The method may comprise transmitting via a network an indication of a set of encrypted versions of formatting tags recognized by the first computing device, and determining a first mapping, the first mapping comprising a mapping of identifiers to formatting tags corresponding to the set of encrypted versions of formatting tags. Further, the method may comprise configuring at least one of an encoder and a decoder of the first computing device with the first mapping.

In still another aspect, a gaming apparatus is provided. The gaming apparatus may include a display unit, a value input device, and a network interface device coupled to a communication link. Additionally, the gaming apparatus may include a controller operatively coupled to the display unit, the value input device, and the network interface device, the controller comprising a processor and a memory operatively coupled to the processor. The controller may be programmed to cause the display unit to generate a game display relating to one of the following games: poker, blackjack, slots, keno or bingo, and to determine a value payout associated with an outcome of the game. The controller may further comprise a negotiator to send via the communication link an indication of a set of formatting tags recognized by the gaming apparatus, and a mapping determiner to determine a mapping of identifiers to formatting tags corresponding to the set of formatting tags. The controller may also comprise at least one of an encoder capable of being configured to encode formatted data based on the mapping, a decoder capable of being configured to decode encoded formatted data based on the mapping, and a parser capable of being configured to parse encoded formatted data based on the mapping.

In another aspect, another gaming apparatus is provided. The gaming apparatus may include a display unit, a value input device, and a network interface device coupled to a communication link. Also, the gaming apparatus may include a controller operatively coupled to the display unit, the value input device, and the network interface device, the controller comprising a processor and a memory operatively coupled to the processor. The controller may be programmed to cause the display unit to generate a game display relating to one of the following games: poker, blackjack, slots, keno or bingo, and to determine a value payout associated with an outcome of the game. The controller also may comprise a negotiator to send via the communication link a set of encrypted versions of formatting tags recognized by the gaming apparatus; and a mapping determiner to determine a mapping of identifiers to formatting tags corresponding to the set of encrypted versions of formatting tags. The controller may further comprise at least one of an encoder capable of being configured to encode formatted data based on a mapping, a decoder capable of being configured to decode encoded formatted data based on the mapping, and a parser capable of being configured to parse encoded formatted data based on the mapping.

Additional aspects of the invention are defined by the claims of this patent.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
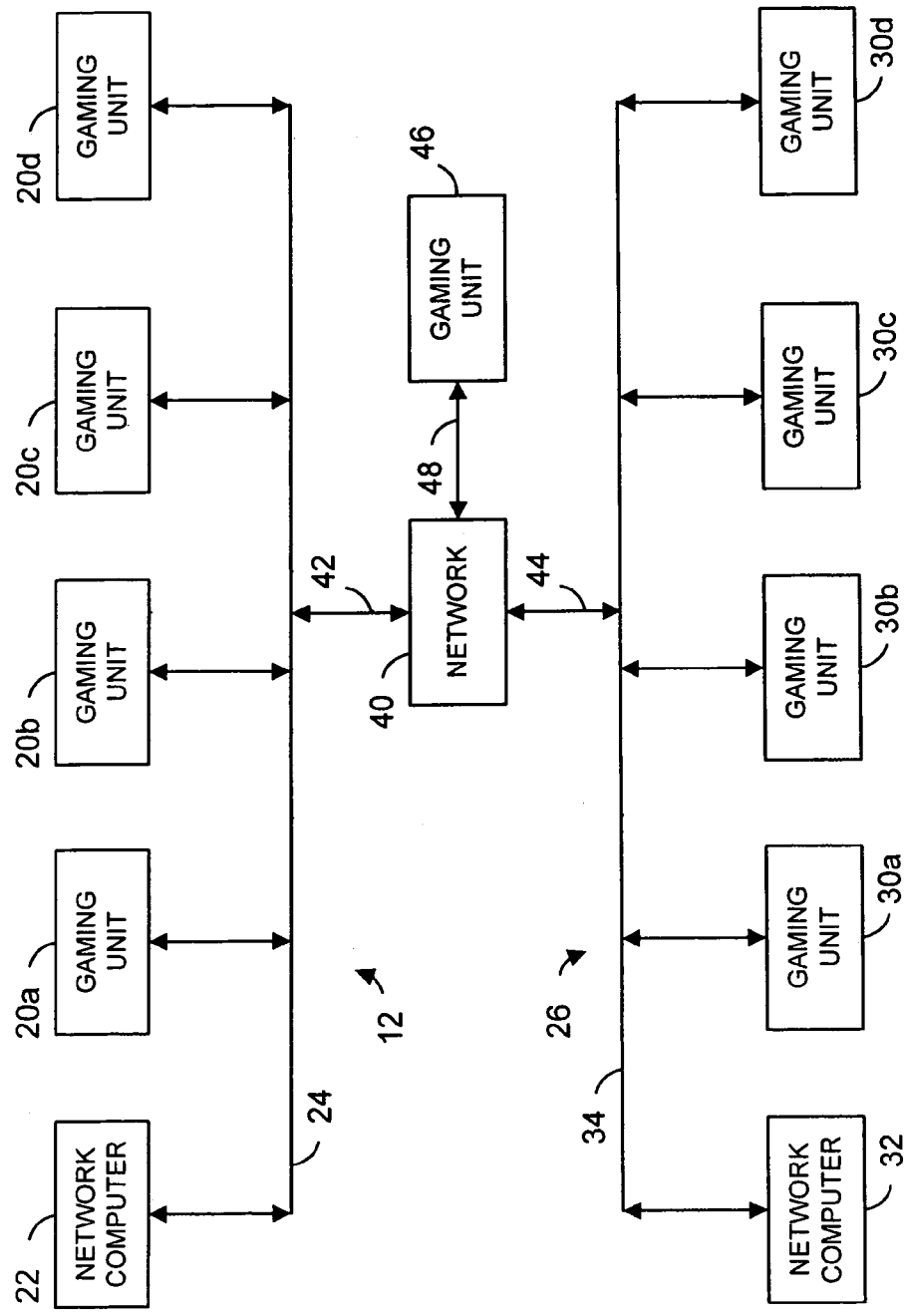
FIG. 1 is a block diagram of an example gaming system.

FIG. 1 illustrates one possible embodiment of a casino gaming system 10 in accordance with the invention. Referring to FIG. 1, the casino gaming system 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may be provided as a dedicated hardwired link or a wireless link. Although the data link 24 is shown as a single data link 24, the data link 24 may comprise multiple data links.

The casino gaming system 10 may also include a gaming unit 46 operatively coupled to the network 40 via a data link 48. Where the network 40 comprises the Internet, data communication may take place over the communication link 48 via an Internet communication protocol.

Figure 2A:
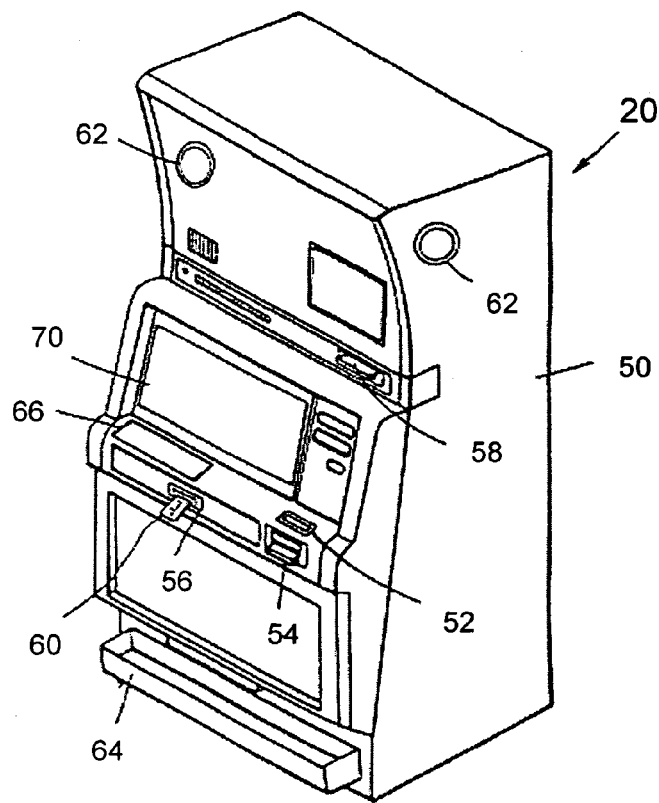
FIG. 2A is a perspective view of an example of a gaming unit shown schematically in FIG. 1.

FIG. 2A is a perspective view of one possible embodiment of one or more of the gaming units 20. Although the following description addresses the design of the gaming units 20, it should be understood that the gaming units 30 and/or 46 may have the same design as the gaming units 20 described below. It should be understood that the design of one or more of the gaming units 20 may be different than the design of other gaming units 20, and that the design of one or more of the gaming units 30 may be different than the design of other gaming units 30. Similarly, the design of the gaming unit 46 may be different than the design of other gaming units 20, 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2A, the casino gaming unit 20 may include a housing or cabinet 50 and one or more input devices, which may include a coin slot or acceptor 52, a paper currency acceptor 54, a ticket reader/printer 56 and a card reader and/or writer (card reader/writer) 58, which may be used, for example, to input value to the gaming unit 20. A value input device may include any device that can accept value from a customer. As used herein, the term "value" may encompass gaming tokens, coins, paper currency, ticket vouchers, credit or debit cards, smart cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader, an optical card reader, a memory card reader, and may be used to read data from a card offered by a player, such as a credit card, a player tracking card, a smart card, a memory card, etc. Also, the card reader 58 may include any type of device for reading data from a portable memory device such as a smart card, a memory card, a memory cartridge, a memory stick, etc. If provided for player tracking purposes, the card reader 58 may be used to read data from, and/or write data to, player tracking cards that are capable of storing data representing the identity of a player, the identity of a casino, the player's gaming habits, etc. The card reader 58 may also be used to read software programs stored on a portable memory device and to be executed by the gaming unit 20.

The gaming unit 20 may include one or more audio speakers 62, a coin payout tray 64, an input control panel 66, and a display unit 70. Where the gaming unit 20 is designed to facilitate play of a video casino game, such as video poker or video slots, the display unit 70 may be a color video display unit that displays images relating to the particular game or games. Where the gaming unit 20 is designed to facilitate play of a reel-type slot machine, the display unit 70 may comprise a plurality of mechanical reels that are rotatable, with each of the reels having a plurality of reel images disposed thereon. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc.

Figure 2B:
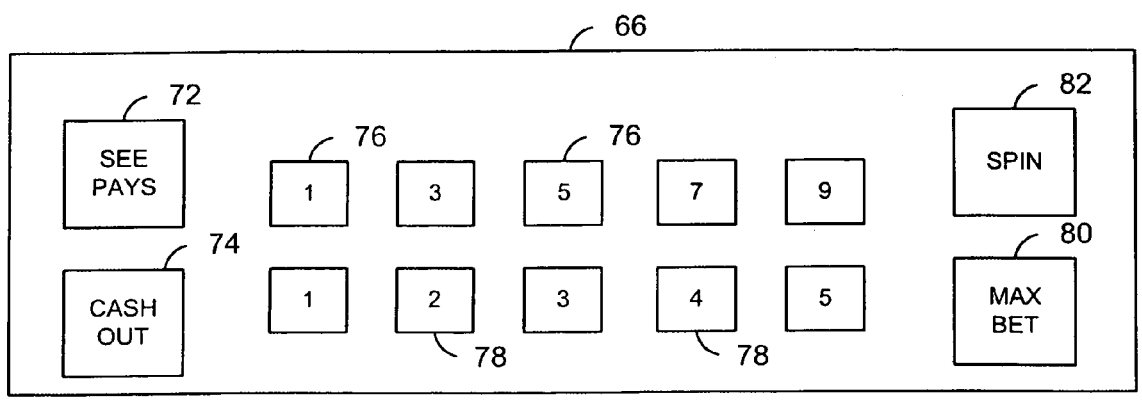
FIG. 2B illustrates an example control panel for a gaming unit.

FIG. 2B illustrates one possible embodiment of the control panel 66, which may be used where the gaming unit 20 is a slot machine having a plurality of mechanical or "virtual" reels. Referring to FIG. 2B, if the display unit 70 is provided in the form of a video display unit, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2B, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. If the display unit 70 is provided as a video display unit, the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

Gaming Unit Electronics

Figure 3:
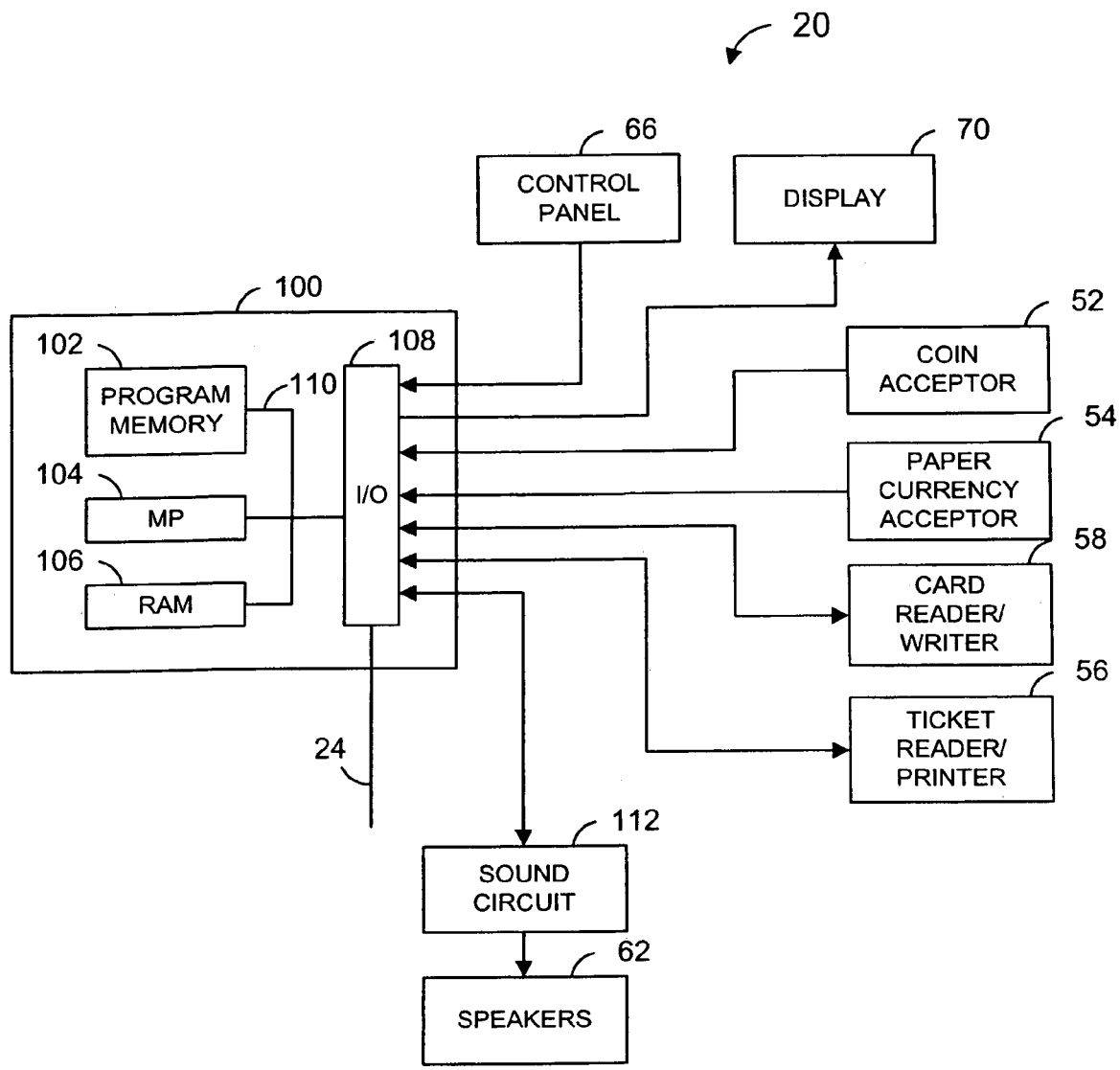
FIG. 3 is a block diagram of the electronic components of the gaming unit of FIG. 2A.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. As just one example, the I/O circuit 108 may comprise a network interface device (not shown) to communicatively couple the controller 100 to the data link 24 and/or the network 40. The RAM(s) 104 and program memories 102 may be implemented as semiconductor memories, magnetically readable memories, and/or optically readable memories, for example.

Although the program memory 102 is shown in FIG. 3 as a read-only memory (ROM) 102, the program memory of the controller 100 may be a read/write or alterable memory, such as a hard disk. In the event a hard disk is used as a program memory, the address/data bus 110 shown schematically in FIG. 3 may comprise multiple address/data buses, which may be of different types, and there may be an I/O circuit disposed between the address/data buses.

FIG. 3 illustrates that the control panel 66, the coin acceptor 52, the paper currency acceptor 54, the card reader 58 and the ticket reader/printer 56 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 66, 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Some or all of the gaming units 20, 30, and 46 may incorporate the same or similar components as described with reference to FIG. 3. Alternatively, some or all of the gaming units 20, 30, and 46 may comprise different components. In one embodiment, the gaming unit 46 may comprise, for example, a personal computer, a workstation, a server, a personal digital assistant, a tablet computing device, a cell phone, a set top box, a video game system (e.g., a PLAYSTATION 1™ or PLAYSTATION 2™ video game system from Sony, an XBOX™ video game system from Microsoft, a GAMECUBE™ video game system from Nintendo, etc.), a hand-held game system (e.g., a GAME BOY™ hand-held game system from Nintendo) etc. Thus, some gaming units 20, 30, and 46 may omit some of the components such as the control panel 66, the coin acceptor 52, the paper currency acceptor 54, the card reader/writer 58, the ticket reader/printer 56, etc., and may include other components such as a keyboard, keypad, touch screen, touch pad, stylus, mouse, trackball, a joy stick, etc.

Network Computer Electronics

Figure 4:
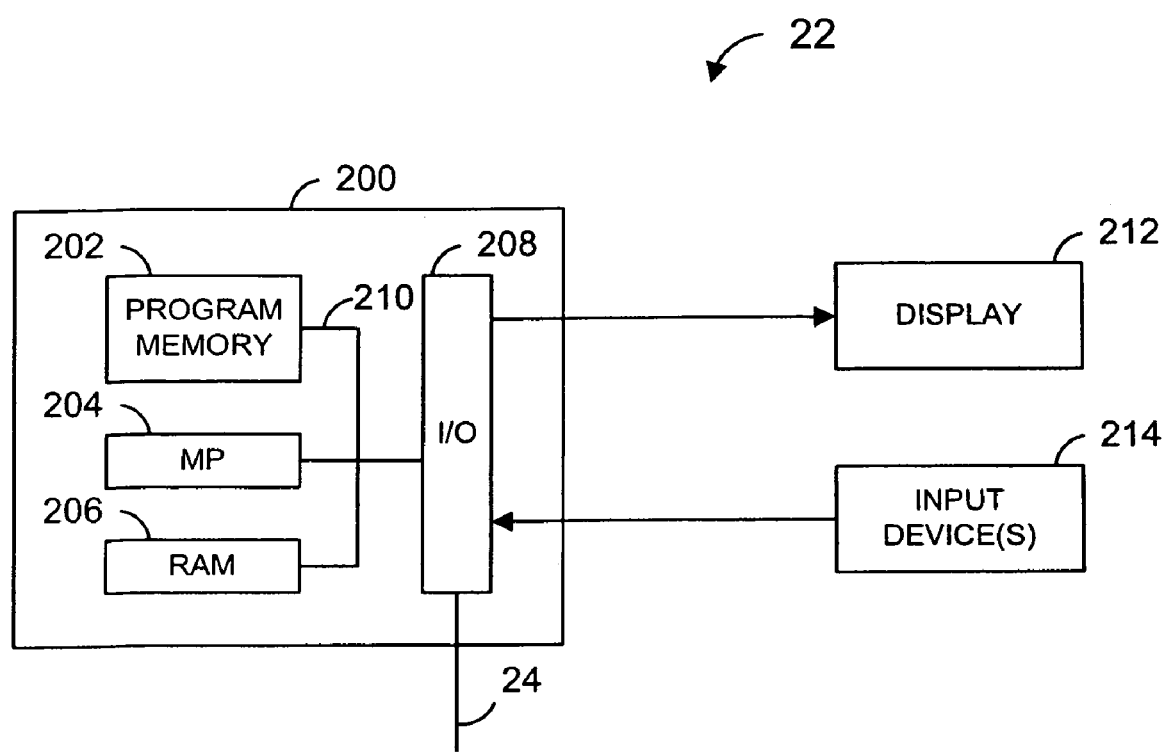
FIG. 4 is a block diagram of the electronic components of the network computer shown schematically in FIG. 1.

The network computer 22 may comprise one or more computing devices such as a desk top computer, a lap top computer, a work station, a server, a mainframe, etc. FIG. 4 is a block diagram of a number of components that may be incorporated in one embodiment of the network computer 22. The network computer 22 may include a controller 200 that may comprise a program memory 202, a microcontroller or microprocessor 204 (hereinafter referred to as microprocessor 204), a RAM 206, and an I/O circuit 208, all of which may be interconnected via an address/data bus 210. It should be appreciated that although only one microprocessor 204 is shown, the controller 200 may include multiple microprocessors 204. Similarly, the memory of the controller 200 may include multiple RAMs 206 and multiple program memories 202. Although the I/O circuit 208 is shown as a single block, it should be appreciated that the I/O circuit 208 may include a number of different types of I/O circuits. As just one example, the I/O circuit 208 may comprise a network interface device (not shown) to communicatively couple the controller 200 to the data link 24 and/or the network 40. The RAM(s) 204 and program memory (or memories) 202 may be implemented as semiconductor memories, magnetically readable memories, and/or optically readable memories, for example. The program memory 202 may be a RAM, a ROM, a read/write or alterable memory such as a hard disk, etc. In the event a hard disk is used as a program memory 202, the address/data bus 210 shown schematically in FIG. 4 may comprise multiple address/data buses, which may be of different types, and there may be an I/O circuit disposed between the address/data buses.

A display 212 and one or more input devices 214 may be operatively coupled to the I/O circuit 208, each of those components being so coupled by either a unidirectional or bidirectional, single-line or multiple-line data link, which may depend on the design of the component that is used. As shown in FIG. 4, the components 212 and 214 may be coupled to the I/O circuit 208 via respective direct links. Different connection schemes could be used. For example, these components may be coupled to the I/O circuit 208 via a common bus or other data link that is shared by a number of components. Furthermore, some of the components may be directly coupled to the microprocessor 204 without passing through the I/O circuit 208.

Data Communication in the Casino Gaming System

Referring again to FIG. 1, devices within the casino gaming system 10 may communicate with each other by sending data via the various networks and data connections. At least some of the data sent between devices may comprise formatted data. Generally, the formatted data may include formatting information that may indicate, for example, how data is to be displayed, how data is to be printed via a printer, how a person or computing system may interact with the data, what type of data is included, etc. In some instances, the formatted data may include formatting symbols ("tags") that convey the formatting information. For example, HTML, XML, and similar standards provide techniques for formatting data by including formatting tags within the data that indicate, for instance, what type of data is included, how to display data, etc. With XML, for example, there may be one or more attribute tags associated with a formatting as well. The terms "formatting tags" and "tags" as used hereinafter may refer to both formatting tags and attribute tags.

Formatting tags may add significantly to the size of the data, and more storage, longer transmission times, more communication capacity, etc., may be needed as a result. Further, the formatting tags may make obvious to a third party or unintended recipient the type of data being sent, how the data is to be displayed, etc.

Figure 5:
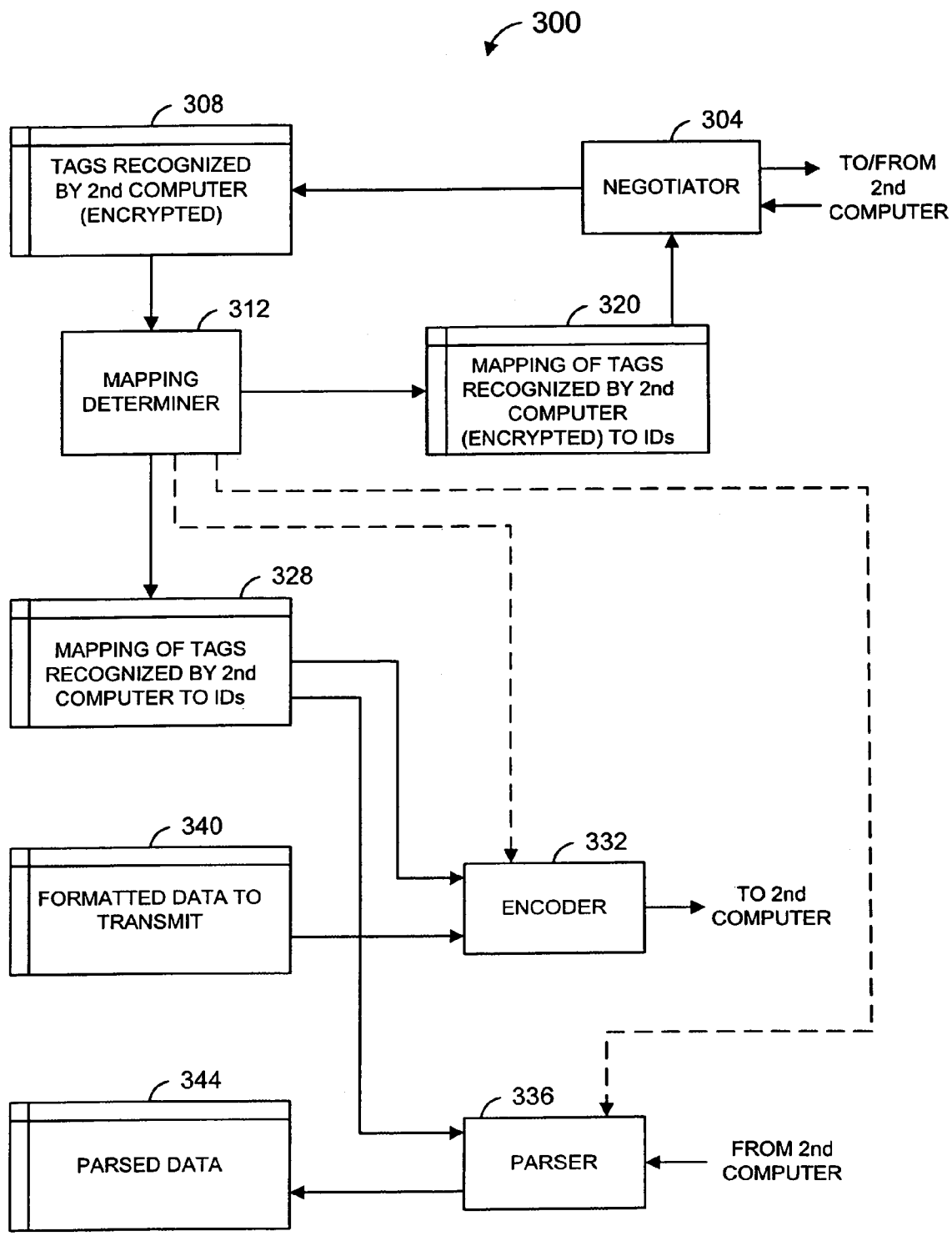
FIG. 5 is a block diagram of an example subsystem for receiving and/or transmitting formatted data.

FIG. 5 is a block diagram of an example subsystem 300 for receiving and/or transmitting formatted data. The subsystem 300 may be implemented by a first computing system (hereinafter "first computer") to receive formatted data from and/or transmit formatted data to a second computing system (hereinafter "second computer"). Referring again to FIG. 1, one of the gaming units 20, 30, and 46 may comprise the first computer and another of the gaming units 20, 30, and 46 may comprise the second computer. As another example, one of the network computers 22 and 32 may comprise the first computer and one of the gaming units 20, 30, and 46 may comprise the second computer. As still another example, one of the gaming units 20, 30, and 46 may comprise the first computer and one of the network computers 22 and 32 may comprise the second computer.

Generally, the first computer may encode formatted data to be sent to the second computer. In particular, the first computer may replace each of at least some formatting tags in the formatted data with a corresponding tag identifier. In some implementations, each tag identifier (ID) may be smaller than its corresponding formatting tag. In these implementations, replacing the formatting tags with the IDs may help reduce the size of the formatted data. When the second computer receives the encoded formatted data, it may parse the received data based on a mapping of IDs to formatting tags. In particular, the second computer may replace IDs in the formatted data with their corresponding formatting tags. Similarly, the second computer may encode formatted data and send it to the first computer. Then, the first computer may parse this encoded formatted data received from the second computer based on a mapping of IDs to formatting tags.

Generally, the first computer may maintain a mapping between formatting tags and IDs, and may communicate an indication of this mapping (or a subset of this mapping) to the second computer so that the second computer can encode and/or parse formatted data according to the mapping. The indication of the mapping may obscure the actual mapping to make it more difficult for a third party, unintended recipient, etc., to determine the formatting tags to which the IDs correspond. For example, the first computer may communicate to the second computer a mapping of IDs to encrypted versions of formatting tags. In some implementations, the first computer may not communicate to the second computer the mapping, but may merely assume that the second computer is aware of the mapping.

Referring again to FIG. 5, the subsystem 300 may comprise a negotiator 304. The negotiator 304 may receive from the second computer an indication of formatting tags recognized by the second computer. The indication may be received via a network and/or communication link such as those described with reference to FIG. 1.

The formatting tags recognized by the second computer may comprise, for example, a subset of the formatting tags recognized by the first computer. As other examples, the formatting tags recognized by the second computer may comprise the same formatting tags recognized by the first computer, or the formatting tags recognized by the second computer may comprise a superset of the formatting tags recognized by the first computer. In the example subsystem 300, the indication of formatting tags recognized by the second computer may comprise encrypted versions of the formatting tags recognized by the second computer. In other implementations, the indication of formatting tags recognized by the second computer need not comprise the formatting tags or encrypted versions of the formatting tags, but may comprise, for example, some identifier of a set of formatting tags (hereinafter "set identifier"). The first computer may then be able to determine the set of formatting tags based on the set identifier. If encrypted versions of the formatting tags recognized by the second computer are received, the negotiator 304 may store the encrypted versions of the formatting tags recognized by the second computer in the memory 308.

The subsystem 300 may further comprise a mapping determiner 312. The mapping determiner 312 may determine a mapping of IDs to corresponding encrypted versions of tags recognized by the second computer. The mapping determiner 312 may be communicatively coupled to the memory 308. The mapping determiner 312 may, for example, generate a mapping of IDs to encrypted versions of tags recognized by the second computer based on the indication of formatting tags recognized by the second computer that was received by the negotiator 304, and may store the generated mapping in a memory 320. The mapping may be generated, for example, based on a mapping of IDs to encrypted versions of tags recognized by the first computer, a mapping of IDs to unencrypted versions of tags recognized by the first computer, etc., for example. As another example, the mapping determiner 312 may select a previously generated mapping of IDs to encrypted versions of tags recognized by the second computer based on the indication of formatting tags recognized by the second computer that was received by the negotiator 304.

The negotiator 304 may be communicatively coupled to the memory 320. After receiving the indication of formatting tags recognized by the second computer, and after the mapping determiner 312 has determined the mapping of IDs to encrypted versions of tags recognized by the second computer, the negotiator 304 may transmit to the second computer an indication of the mapping. The indication may be transmitted via a network and/or communication link such as those described with reference to FIG. 1. The indication of the mapping may comprise the mapping or a mapping identifier that identifies the mapping.

The mapping determiner 312 may also determine a mapping of IDs to corresponding tags recognized by the second computer. The mapping determiner 312 may, for example, generate a mapping of IDs to tags recognized by the second computer based on the indication of formatting tags recognized by the second computer that was received by the negotiator 304, and may store the generated mapping in a memory 328. For instance, the mapping determiner 312 may convert the mapping of IDs to corresponding encrypted versions of tags recognized by the second computer into the mapping of IDs to corresponding tags recognized by the second computer. As another example, the mapping determiner 312 may select a previously generated mapping of IDs to corresponding tags recognized by the second computer based on the indication of formatting tags recognized by the second computer.

The subsystem 300 may also comprise an encoder 332 and/or a parser 336, each communicatively coupled to the memory 328. The encoder 332 may encode formatted data (stored in a memory 340), which is to be transmitted to the second computer, based on the mapping stored in the memory 328. In particular, the encoder 332 may replace formatting tags in the formatted data with corresponding IDs as indicated by the mapping stored in the memory 328. The encoder 332 may optionally provide further encoding of the formatted data as well. The encoded data may then be transmitted to the second computer via a network and/or communication link such as those described with reference to FIG. 1.

Similarly, the parser 336 may parse encoded data received from the second computer based on the mapping stored in the memory 328. The encoded data may be received from the second computer via a network and/or communication link such as those described with reference to FIG. 1. The parser 336 may parse the received encoded data based on the IDs in the formatted data. The parsed data may then be stored in a memory 344.

Optionally, a decoder (not shown) may first decode the encoded data received from the second computer based on the mapping stored in the memory 328. In particular, the decoder may replace IDs in the encoded data with corresponding formatting tags as indicated by the mapping stored in the memory 328. The decoded formatted data may then be parsed.

In another example, if the mapping determiner 312 selects a previously generated mapping of IDs, the mapping determiner 312 may provide data to the encoder 332, the parser 336, and/or the decoder (not shown), that indicates the mapping to be used.

Although the memories 308, 320, 328, 340, and 344 are depicted in FIG. 5 as being separate memories, various ones of the memories 308, 320, 328, 340, and 344 may be combined with one or more other memories 308, 320, 328, 340, and 344. Referring to FIGS. 3 and 4, some or all of the memories 308, 320, 328, 340, and 344 may be implemented as portions of the memories 102, 106, 202, and/or 206, for example.

Each of the blocks 304, 312, 332, and 336 may be implemented via software, hardware, and/or firmware. Referring to FIG. 4, as just one example, if the subsystem 300 is implemented by the network computer 22, the controller 200 may be configured via software to implement the blocks 304, 312, 332, and 336. As another example, the controller 200 may include additional hardware (not shown in FIG. 4) for implementing one or more of the blocks 304, 312, 332, and 336.

Figure 6:
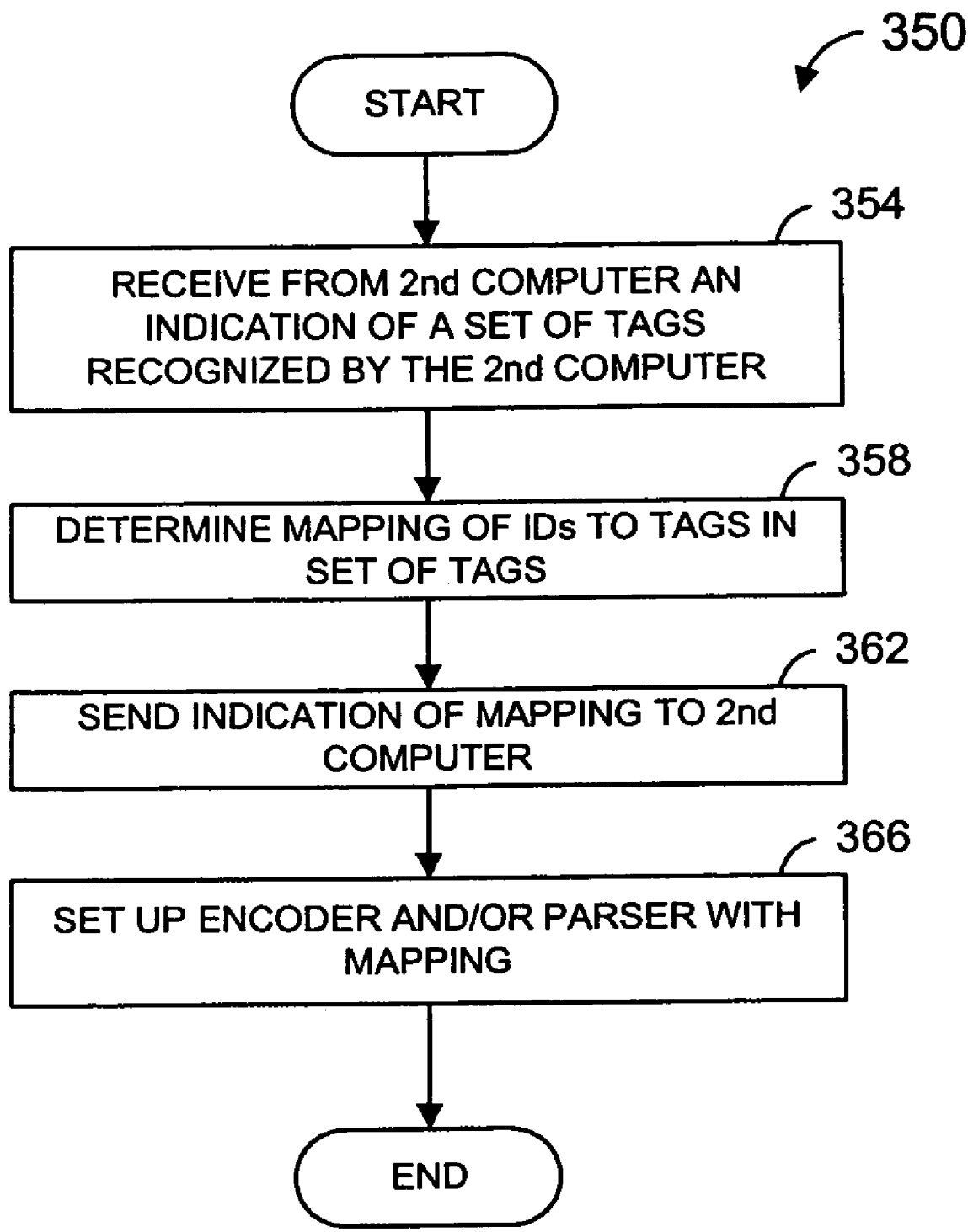
FIG. 6 is a flow diagram of an example routine for configuring an encoder and/or a decoder of a gaming unit and/or a network computer.

FIG. 6 is a flow diagram of an example routine 350 for configuring an encoder and/or a decoder of a first computer for sending/receiving information to/from a second computer. The routine 350 may be implemented by the subsystem 300 of FIG. 5, for example, and will be described with reference to FIG. 5. It will be understood, however, that the routine 350 can be implemented by systems different than the subsystem 300 of FIG. 5.

At a block 354, the first computer may receive an indication of a set of formatting tags recognized by the second computer. In the subsystem 300, for instance, the negotiator 304 may receive the indication from the second computer via a network and/or communication link such as those described with reference to FIG. 1. The indication may comprise, for example, the set of formatting tags recognized by the second computer, a set of encrypted versions of formatting tags recognized by the second computer, a set identifier from which the set of formatting tags or the set of encrypted versions of formatting tags can be determined, etc.

At a block 358, a mapping of IDs to formatting tags recognized by the second computer may be determined. In the subsystem 300, for instance, the mapping determiner 312 may determine the mapping based on the indication of encrypted versions of formatting tags received from the second computer. The mapping may be generated in response to receiving the indication of encrypted versions of formatting tags, or selected from mappings previously generated, for example. The determined mapping could comprise a mapping of IDs to encrypted tags or a mapping of IDs to unencrypted tags, for example. If generated in response to receiving the indication of encrypted versions of formatting tags, the mapping may be generated, for example, based on a mapping of IDs to encrypted versions of tags recognized by the first computer, a mapping of IDs to unencrypted versions of tags recognized by the first computer, etc., for example.

At a block 362, an indication of the mapping determined at the block 358 may be sent to the second computer via a network and/or communication link such as those described with reference to FIG. 1. In the subsystem 300, for instance, the negotiator 304 may send the indication of the mapping to the second computer. The indication of the mapping of IDs to formatting tags recognized by the second computer may comprise, for example, the mapping determined at the block 358, an identifier from which the mapping can be determined, a mapping of IDs to encrypted versions of formatting tags recognized by the second computer, a mapping of IDs to unencrypted versions of formatting tags recognized by the second computer, etc.

At a block 366, the encoder and/or parser (and/or decoder) of the first computer may be configured with the mapping determined at the block 358. In the subsystem 300, for instance, the mapping may be stored in the memory 328 so that the encoder 332 and parser 336 may access the mapping. As another example, an indication of the mapping may be provided to the encoder 332 and parser 336 so that so that the encoder 332 and parser 336 may access the appropriate mapping.

Figure 7:
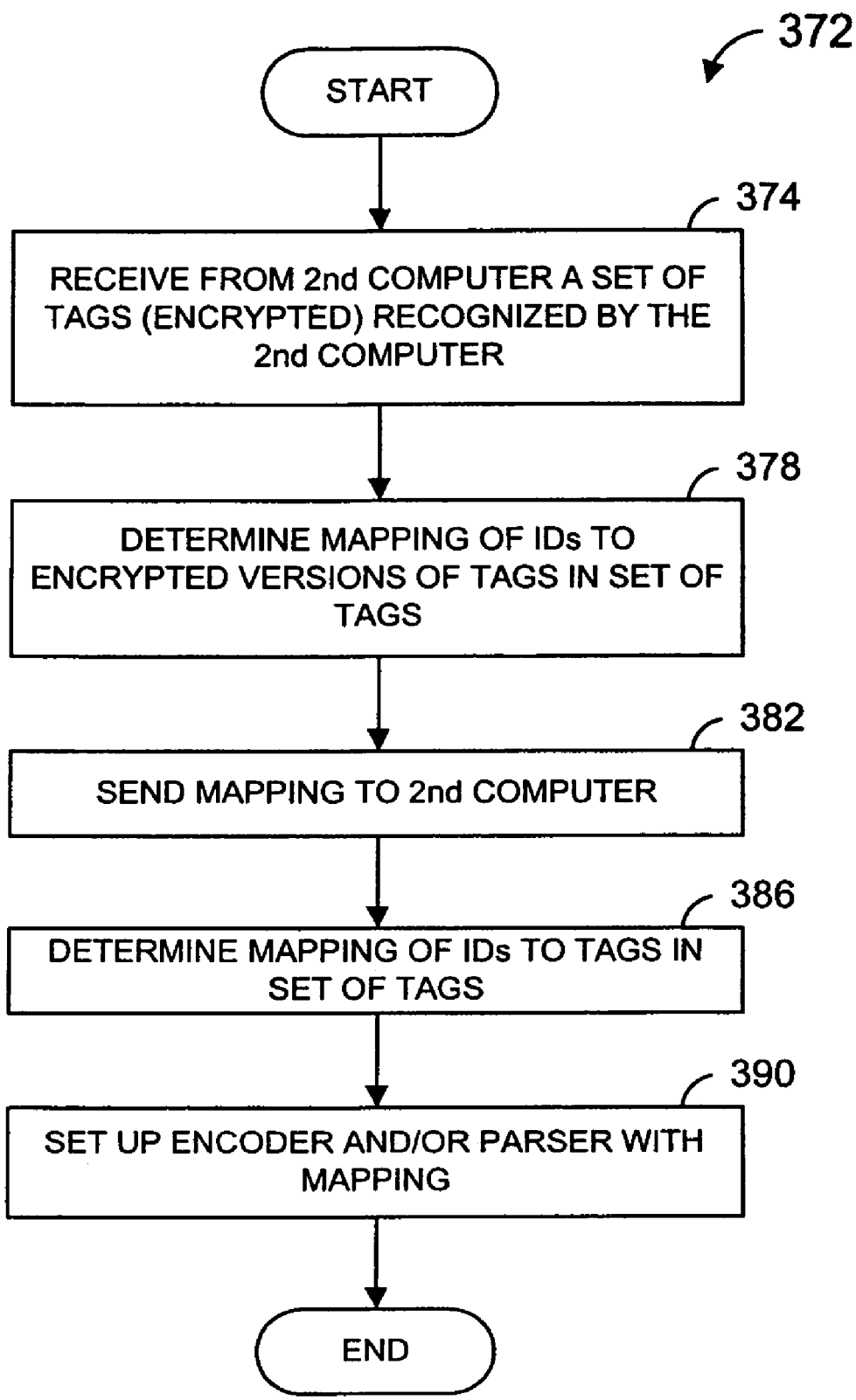
FIG. 7 is a flow diagram of another example routine for configuring an encoder and/or a decoder of a gaming unit and/or a network computer.

FIG. 7 is a flow diagram of another example routine 372 for configuring an encoder and/or a decoder of the first computer for sending/receiving information to/from the second computer. The routine 372 may be implemented by the subsystem 300 of FIG. 5, for example, and will be described with reference to FIG. 5. It will be understood, however, that the routine 350 can be implemented by systems different than the subsystem 300 of FIG. 5.

At a block 374, the first computer may receive a set of encrypted versions of formatting tags recognized by the second computer. In the subsystem 300, for instance, the negotiator 304 may receive the set of encrypted versions of formatting tags from the second computer via a network and/or communication link such as those described with reference to FIG. 1.

At a block 378, a mapping of IDs to encrypted versions of formatting tags recognized by the second computer may be determined. In the subsystem 300, for instance, the mapping determiner 312 may determine the mapping. The mapping may be generated, for example, based on a mapping of IDs to encrypted versions of tags recognized by the first computer, a mapping of IDs to unencrypted versions of tags recognized by the first computer, etc., for example.

At a block 382, an indication of the mapping determined at the block 378 may be sent to the second computer via a network and/or communication link such as those described with reference to FIG. 1. In the subsystem 300, for instance, the negotiator 304 may send the indication of the mapping to the second computer. The indication of the mapping may comprise the mapping or an identifier of the mapping, for example.

At a block 386, a mapping of IDs to formatting tags recognized by the second computer may be determined. In the subsystem 300, for instance, the mapping determiner 312 may determine the mapping by converting the mapping of IDs to encrypted versions of formatting tags recognized by the second computer determined at the block 378. For instance, the mapping could be determined by decrypting the encrypted versions of formatting tags in the mapping determined at the block 378. Also, the mapping could be determined based on the mapping determined at the block 378 using another mapping of formatting tags to encrypted versions of formatting tags.

At a block 390, the encoder and/or parser (and/or decoder) of the first computer may be configured with the mapping determined at the block 386. In the subsystem 300, for instance, the mapping may be stored in the memory 328 so that the encoder 332 and decoder 336 may access the mapping.

Figure 8:
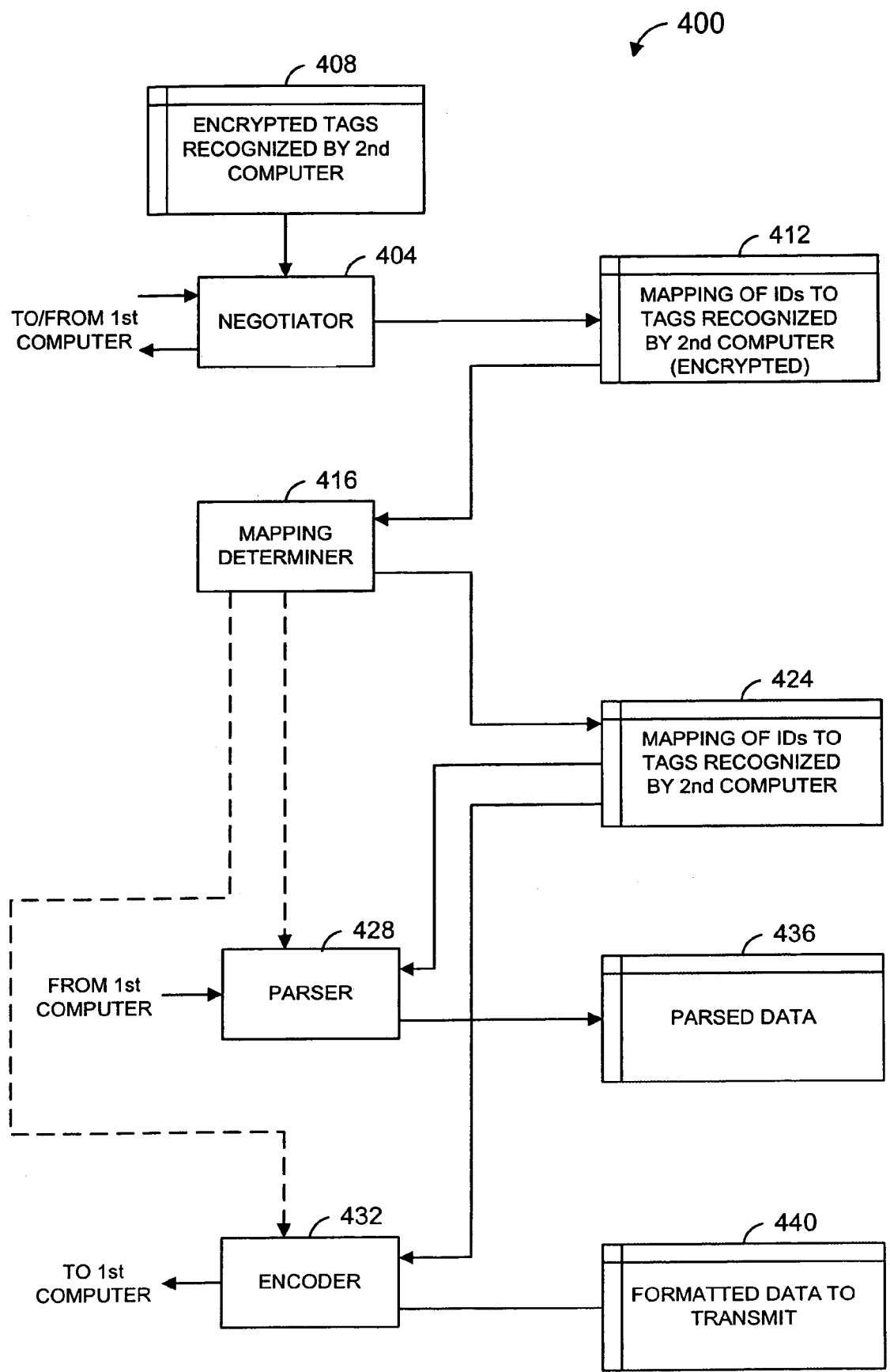
FIG. 8 is a block diagram of another example subsystem for receiving and/or transmitting formatted data.

FIG. 8 is a block diagram of an example subsystem 400 for receiving and/or transmitting formatted data that may be implemented by the second computer. The second computer may encode formatted data and send it to the first computer. In particular, the second computer may replace formatting tags in the formatted data with their corresponding IDs. Similarly, the second computer may receive encoded formatted data from the first computer. Then, the second computer may parse this encoded formatted data received from the first computer based on a mapping of IDs to formatting tags.

The subsystem 400 may comprise a negotiator 404. The negotiator 404 may transmit to the first computer an indication of formatting tags recognized by the second computer. The indication may be sent via a network and/or communication link such as those described with reference to FIG. 1.

The formatting tags recognized by the second computer may comprise, for example, a subset of the formatting tags recognized by the first computer, the set of formatting tags recognized by the first computer, or a superset of formatting tags recognized by the first computer. In the example subsystem 400, the indication of formatting tags recognized by the second computer may comprise encrypted versions of the formatting tags recognized by the second computer. In other implementations, the indication of formatting tags recognized by the second computer need not comprise the formatting tags or encrypted versions of the formatting tags, but may comprise a set identifier. The negotiator 404 may be communicatively coupled to a memory 408 that stores the encrypted versions of the formatting tags recognized by the second computer.

After sending the indication of the formatting tags recognized by the second computer, the negotiator 404 may receive from the first computer an indication of a mapping of IDs to formatting tags recognized by the second computer. The indication may be received via a network and/or communication link such as those described with reference to FIG. 1. The indication of the mapping may comprise, for example, a mapping of IDs to encrypted versions of tags, a mapping of IDs to unencrypted versions of tags, an identifier of a mapping, etc. If the negotiator 404 receives the mapping of IDs to encrypted versions of tags, the negotiator 404 may store the mapping of IDs to encrypted versions of tags in a memory 412.

The subsystem 400 may also comprise a mapping determiner 416, which may be communicatively coupled to the memory 412 and/or to the negotiator 404. The mapping converter 416 may determine a mapping of IDs to tags recognized by the second computer. For example, the mapping determiner 416 may use a mapping of encrypted versions of tags to tags and the mapping stored in the memory 412 to generate the mapping of IDs to tags recognized by the second computer. As another example, the mapping determiner 416 may decrypt the encrypted versions of tags in the mapping of IDs to encrypted versions of tags recognized by the second computer to generate the mapping of IDs to tags recognized by the second computer. As yet another example, if an identifier of the mapping is received by the negotiator 304, the mapping determiner may determine the mapping based on the identifier. The mapping determiner 416 may, for example, store the mapping of IDs to tags recognized by the second computer in a memory 424.

The subsystem 400 may also comprise a parser 428 and/or an encoder 432, each communicatively coupled to the memory 424. The parser 428 may parse encoded data received from the first computer based on the mapping stored in the memory 424. The encoded data may be received from the first computer via a network and/or communication link such as those described with reference to FIG. 1.

Optionally, a decoder (not shown) may first decode the encoded data received from the first computer based on the mapping stored in the memory 424. In particular, the decoder may replace IDs in the encoded data with corresponding formatting tags as indicated by the mapping stored in the memory 424. The decoded formatted data may then be parsed.

Similarly, the encoder 432 may encode formatted data (stored in a memory 440) to be transmitted to the first computer based on the mapping stored in the memory 424. In particular, the encoder 432 may replace formatting tags in the formatted data with corresponding IDs as indicated by the mapping stored in the memory 424. The encoded data may then be transmitted to the first computer via a network and/or communication link such as those described with reference to FIG. 1.

In another example, if the mapping determiner 416 selects a previously generated mapping of IDs, the mapping determiner 416 may provide data to the encoder 432, the parser 428, and/or the decoder (not shown), that indicates the mapping to be used.

Although the memories 408, 412, 424, 436 and 440 are depicted in FIG. 8 as being separate memories, various ones of the memories 408, 412, 424, 436 and 440 may be combined with one or more other memories 408, 412, 424, 436 and 440. Referring to FIGS. 3 and 4, some or all of the memories 408, 412, 424, 436 and 440 may be implemented as portions of the memories 102, 106, 202, and/or 206, for example.

Each of the blocks 404, 416, 428, and 432 may be implemented via software, hardware, and/or firmware. Referring to FIG. 3, as just one example, if the subsystem 400 is implemented by the gaming unit 20, the controller 100 may be configured via software to implement the blocks 404, 416, 428, and 432. As another example, the controller 100 may include additional hardware (not shown in FIG. 3) for implementing one or more of the blocks 404, 416, 428, and 432.

Figure 9:
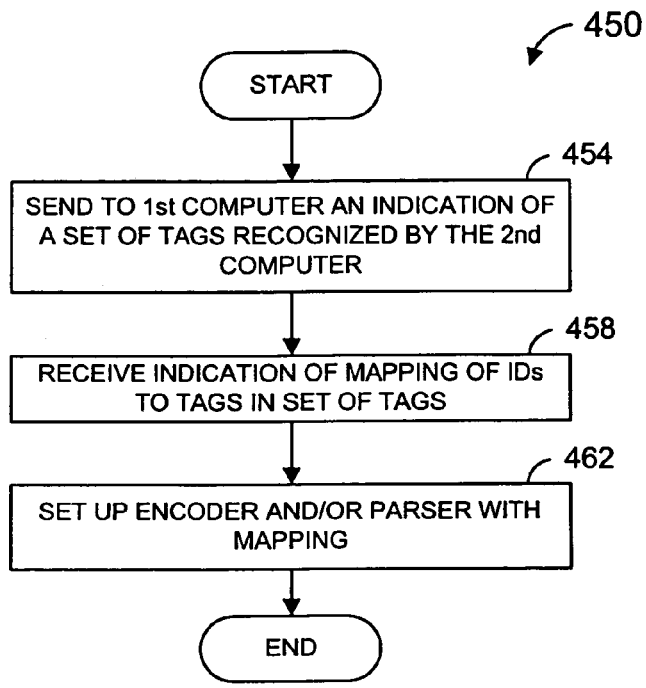
FIG. 9 is a flow diagram of yet another example routine for configuring an encoder and/or a decoder of a gaming unit and/or a network computer.

FIG. 9 is a flow diagram of an example routine 450 for configuring an encoder and/or a decoder of the second computer for sending/receiving information to/from the first computer. The routine 450 may be implemented by the subsystem 400 of FIG. 8, for example, and will be described with reference to FIG. 8. It will be understood, however, that the routine 450 can be implemented by systems different than the subsystem 400 of FIG. 8.

At a block 454, the second computer may send to the first computer an indication of a set of formatting tags recognized by the second computer. In the subsystem 400, for instance, the negotiator 404 may send the indication to the first computer via a network and/or communication link such as those described with reference to FIG. 1. The indication may comprise, for example, the set of formatting tags recognized by the second computer, a set of encrypted versions of formatting tags recognized by the second computer, a set identifier from which the set of formatting tags or the set of encrypted versions of formatting tags can be determined, etc.

At a block 458, an indication of a mapping of IDs to formatting tags may be received from the first computer via a network and/or communication link such as those described with reference to FIG. 1. In the subsystem 400, for instance, the negotiator 404 may receive the indication of the mapping. The indication of the mapping of IDs to formatting tags recognized by the second computer may comprise, for example, the mapping, an identifier from which the mapping can be determined, a mapping of IDs to encrypted versions of formatting tags recognized by the second computer, etc.

At a block 462, the encoder and/or parser of the second computer may be configured with the mapping to which the identifier received at the block 458 corresponds. In the subsystem 400, for instance, the mapping may be stored in the memory 424 so that the parser 428 and encoder 432 may access the mapping. As another example, the parser 428 and encoder 432 may be configured to identify the mapping.

Figure 10:
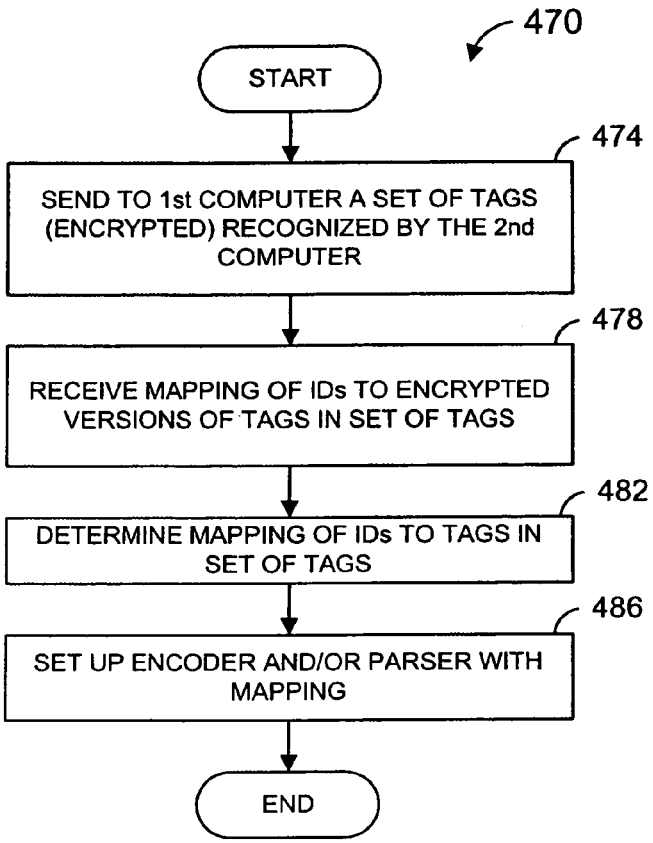
FIG. 10 is a flow diagram of still another example routine for configuring an encoder and/or a decoder of a gaming unit and/or a network computer.

FIG. 10 is a flow diagram of another example routine 470 for configuring an encoder and/or a decoder of the second computer for sending/receiving information to/from the first computer. The routine 470 may be implemented by the subsystem 400 of FIG. 8, for example, and will be described with reference to FIG. 8. It will be understood, however, that the routine 470 can be implemented by systems different than the subsystem 400 of FIG. 8.

At a block 474, the second computer may send to the first computer a set of encrypted versions of formatting tags recognized by the second computer. In the subsystem 400, for instance, the negotiator 404 may send the set of encrypted versions of formatting tags to the first computer via a network and/or communication link such as those described with reference to FIG. 1.

At a block 478, a mapping of IDs to encrypted versions of formatting tags may be received from the first computer via a network and/or communication link such as those described with reference to FIG. 1. In the subsystem 400, for instance, the negotiator 404 may receive the mapping.

At a block 482, a mapping of IDs to formatting tags recognized by the second computer may be determined. In the subsystem 400, for instance, the mapping determiner 416 may determine the mapping by converting the mapping of IDs to encrypted versions of formatting tags recognized by the second computer received at the block 478. For instance, the mapping could be determined by decrypting the encrypted versions of formatting tags in the mapping received at the block 478. Also, the mapping could be determined based on the mapping determined at the block 478 using another mapping of formatting tags to encrypted versions of formatting tags.

At a block 486, the parser and/or encoder of the second computer may be configured with the mapping determined at the block 482. In the subsystem 400, for instance, the mapping may be stored in the memory 424 so that the parser 428 and encoder 432 may access the mapping.

In some implementations, the second computer need not send encrypted versions of formatting tags recognized by the second computer. Rather, the second computer may merely send, for example, unencrypted formatting tags recognized by the second computer. Similarly, the first computer need not send a mapping of IDs to encrypted versions of formatting tags recognized by the second computer. Rather, the first computer may merely send, for example, a mapping of IDs to formatting tags recognized by the second computer.

In some implementations, the first computer need not send an indication of the mapping to the second computer. Rather, it may be assumed that the second computer is already aware of the mapping. For example, the second computer may have previously generated the mapping, or the mapping may have been previously "installed" on the second computer. In these implementations, some of the blocks of FIGS. 5-10 may be omitted. In FIGS. 5-7, for example, blocks 320, 362, 378, and 382 may be omitted. In FIGS. 8-10, for example, blocks 412, 416, 458, and 478 may be omitted.

In some instances, the first computer may not recognize formatting tags recognized by the second computer and/or vice versa. In these instances, a computer may ignore the formatting tags (or the IDs corresponding to those formatting tags) that it does not recognize.

Various manners in which one or more of the gaming units 20, 30, and 46 and/or one or more of the network computers 22 and 32, may operate have been described above in connection with the block diagrams of FIGS. 5 and 8. It is to be understood that in different implementations, blocks may be modified, combined, omitted, etc., and additional blocks may be added. Additionally, various manners in which one or more of the gaming units 20, 30, and 46 and/or one or more of the network computers 22 and 32, may operate have also been described above in connection with a number of flow diagrams that may represent a number of portions or routines of one or more computer programs, which may be stored in one or more of the memories of the controllers 100 and 200. The computer program(s) or portions thereof may be stored remotely, outside of the gaming unit 20, 30, 46 or network computer 22, 32, and may control the operation of the gaming unit 20, 30, 46 or network computer 22, 32 from a remote location. Such remote control may be facilitated with the use of a wireless connection, or by an Internet interface that connects the gaming unit 20, 30, 46 or network computer 22, 32 with a remote computer (such as another one of the gaming units 20, 30, 46 or network computers 22, 32) having a memory in which the computer program portions are stored. The computer program portions may be written in any high level language such as C, C++, C#, Java or the like or any low-level assembly or machine language. By storing the computer program portions therein, various portions of the memories 102, 106 are physically and/or structurally configured in accordance with computer program instructions. Further, some or all of the routines may be implemented using hardware and/or firmware.

Example Tag Identifier Format

FIGS. 11A, 11B, 12A, and 12B illustrate an example ID format for use with data formatted according to XML. It will be understood by those of ordinary skill in the art that, with data formatted according to XML, many other formats may be used as well. Further, it will be understood by those of ordinary skill in the art that, with data formatted according to other standards or languages, a variety of formats may be used including formats similar to the example format of FIGS. 11A, 11B, 12A, and 12B.

Figure 11A:
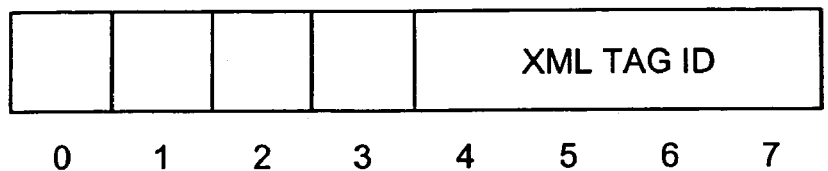
FIGS. 11A and 11B are an example format of a tag identifier.
Figure 11B:
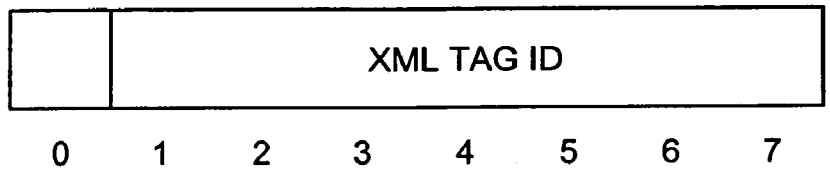
Figure 12A:
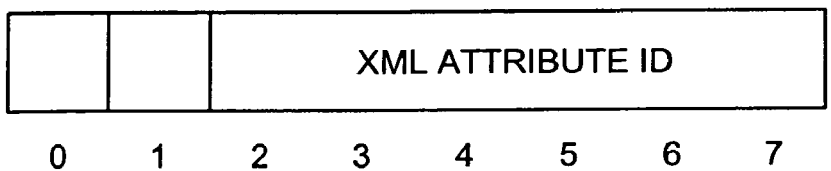
FIGS. 12A and 12B are another example format of a tag identifier.
Figure 12B:
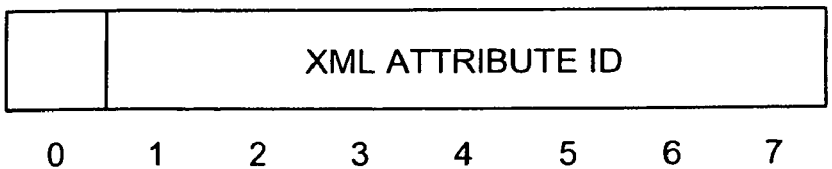

FIGS. 11A and 11B illustrate an example format of a tag token and FIGS. 12A and 12B illustrate an example format of an attribute token corresponding to attributes that may be included as part of, or associated with, an XML formatting tag. A tag identifier (ID), as described above, may comprise a tag token and/or an attribute token.

The tag token may comprise one or more bytes. The first byte of the tag token, which is illustrated in FIG. 11A, may include one or more bits (e.g., bits 3-7) that help indicate the tag token as well as one or more other bits (e.g., bits 0-3) that provide other information about the tag token and/or the ID corresponding to the tag token. For example, bit 0 may indicate whether the tag token corresponds to a start tag or an end tag. Bit 1 may indicate whether the tag corresponding to the ID includes attributes. Attributes of a tag will be discussed further below. Bit 2 may indicate whether the tag corresponding to the ID includes content data. Bit 3 may indicate whether the tag token comprises further bytes.

If the tag token does comprise at least a second byte, the format of the additional one or more bytes is illustrated in FIG. 11B. Each additionally byte may include one or more bits (e.g., bits 1-7) that help indicate the tag token as well as one or more other bits (e.g., bit 0) that provide other information about the tag token and/or the ID corresponding to the tag token. For example, bit 0 may indicate whether the ID comprises further bytes.

An XML tag may include one or more attributes. In one example, each tag token may have an associated list of possible attribute tokens, and two different attributes corresponding to two different XML tags may have the same attribute token. In this case, context may be used to determine the attribute to which an attribute token may correspond. In another example, each attribute may have a corresponding unique attribute token.

FIGS. 12A and 12B illustrate an example format of an attribute token corresponding to an attribute of a formatting tag. If the formatting tag corresponding to the ID includes attributes, these attributes may be encoded using a format such as the example format of FIGS. 12A and 12B. The first byte of the attribute token, which is illustrated in FIG. 12A, may include one or more bits (e.g., bits 2-7) that help indicate the attribute token as well as one or more other bits (e.g., bits 0 and 1) that provide other information about the attribute, the attribute token, and/or other attributes associated with the formatting tag. For example, bit 0 may indicate whether one or more other attribute tokens follow the present token. Bit 1 may indicate whether the present attribute token comprises further bytes.

If the attribute token does comprise at least a second byte, the format of the additional one or more bytes is illustrated in FIG. 12B. Each additionally byte may include one or more bits (e.g., bits 1-7) that help indicate the attribute token as well as one or more other bits (e.g., bit 0) that provide other information about the attribute token. For example, bit 0 may indicate whether the attribute token comprises further bytes.

Encrypted Version of Formatting Tag

As discussed above, the first computer may send an indication of a mapping of IDs to formatting tags. In some implementations, the actual mapping may be obscured to make it more difficult for a third party, unintended recipient, etc., to determine the formatting tags to which the IDs correspond. For example, the first computer may communicate to the second computer a mapping of IDs to encrypted versions of formatting tags.

In general, a formatting tag may be encrypted using any of a variety of techniques, including known techniques, to convert the formatting tag into a form that cannot be easily understood by an unauthorized party. As used herein, the term "encrypted" refers to converting data into a form that is not easily understood by an authorized party. An "encrypted" formatting tag thus may be encrypted using two-way encryption techniques as well as one-way encryption techniques such as, for example, a hash algorithm such as MD2, MD4, MD5, the secure hash algorithm (SHA), etc. If using one-way encryption, an unencrypted version of a formatting tag may be determined from the encrypted version by using, for example, a look up table.

In implementations in which the data is formatted according to XML, different tags may have the same name but have different namespaces. In this case, an encryption algorithm may be applied to the combination of the namespace and the tag name so that different tags with the same name can be distinguished. In other implementations, different tags may not share the same name, and thus an encryption algorithm may be applied only to the tag names.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C++, C#, Java or the like or any low-level assembly or machine language. By storing the computer program portions therein, various portions of the memories 102, 106 are physically and/or structurally configured in accordance with computer program instructions.

Figure 13:
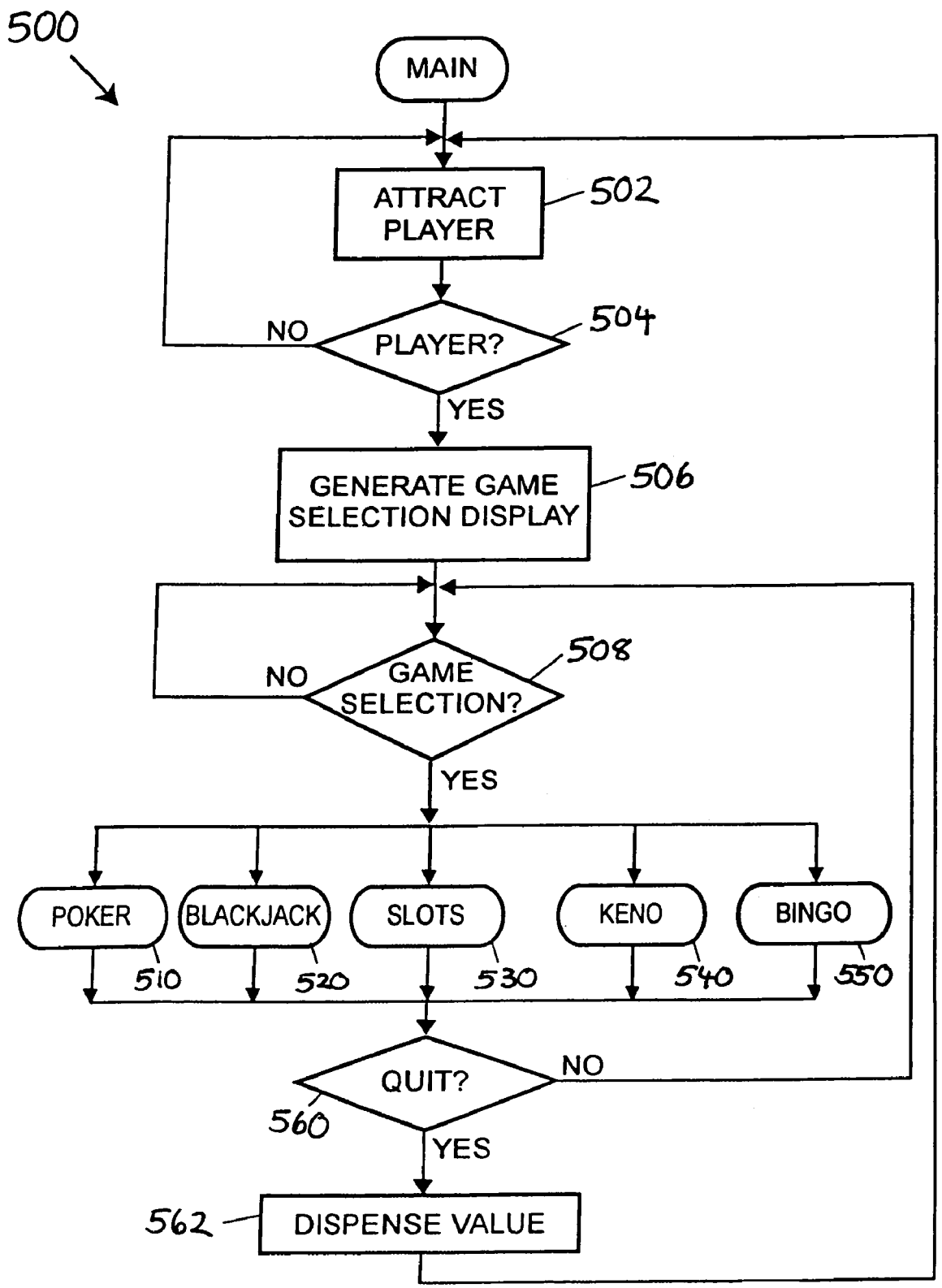
FIG. 13 is a flowchart of an embodiment of a main routine that may be performed during operation of one or more of the gaming units.

FIG. 13 is a flowchart of a main operating routine 500 that may be stored in the memory of the controller 100. Referring to FIG. 13, the main routine 500 may begin operation at block 502 during which an attraction sequence may be performed in an attempt to induce a potential player in a casino to play the gaming unit 20. The attraction sequence may be performed by displaying one or more video images on the display unit 70 (if provided as a video display unit) and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 504, the attraction sequence may be terminated and a game-selection display may be generated on the display unit 70 (if provided as a video display unit) at block 506 to allow the player to select a game available on the gaming unit 20. The gaming unit 20 may detect an input at block 504 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The game-selection display generated at block 506 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 508, the controller 100 may cause one of a number of game routines to be performed to allow the selected game to be played. For example, the game routines could include a video poker routine 510, a video blackjack routine 520, a slots routine 530, a video keno routine 540, and a video bingo routine 550. At block 508, if no game selection is made within a given period of time, the operation may branch back to block 502.

After one of the routines 510, 520, 530, 540, 550 has been performed to allow the player to play one of the games, block 560 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 562 based on the outcome of the game(s) played by the player. The operation may then return to block 502. If the player did not wish to quit as determined at block 560, the routine may return to block 508 where the game-selection display may again be generated to allow the player to select another game.

It should be noted that although five gaming routines are shown in FIG. 13, a different number of routines could be included to allow play of a different number of games. The gaming unit 20 may also be programmed to allow play of different games.

Figure 14:
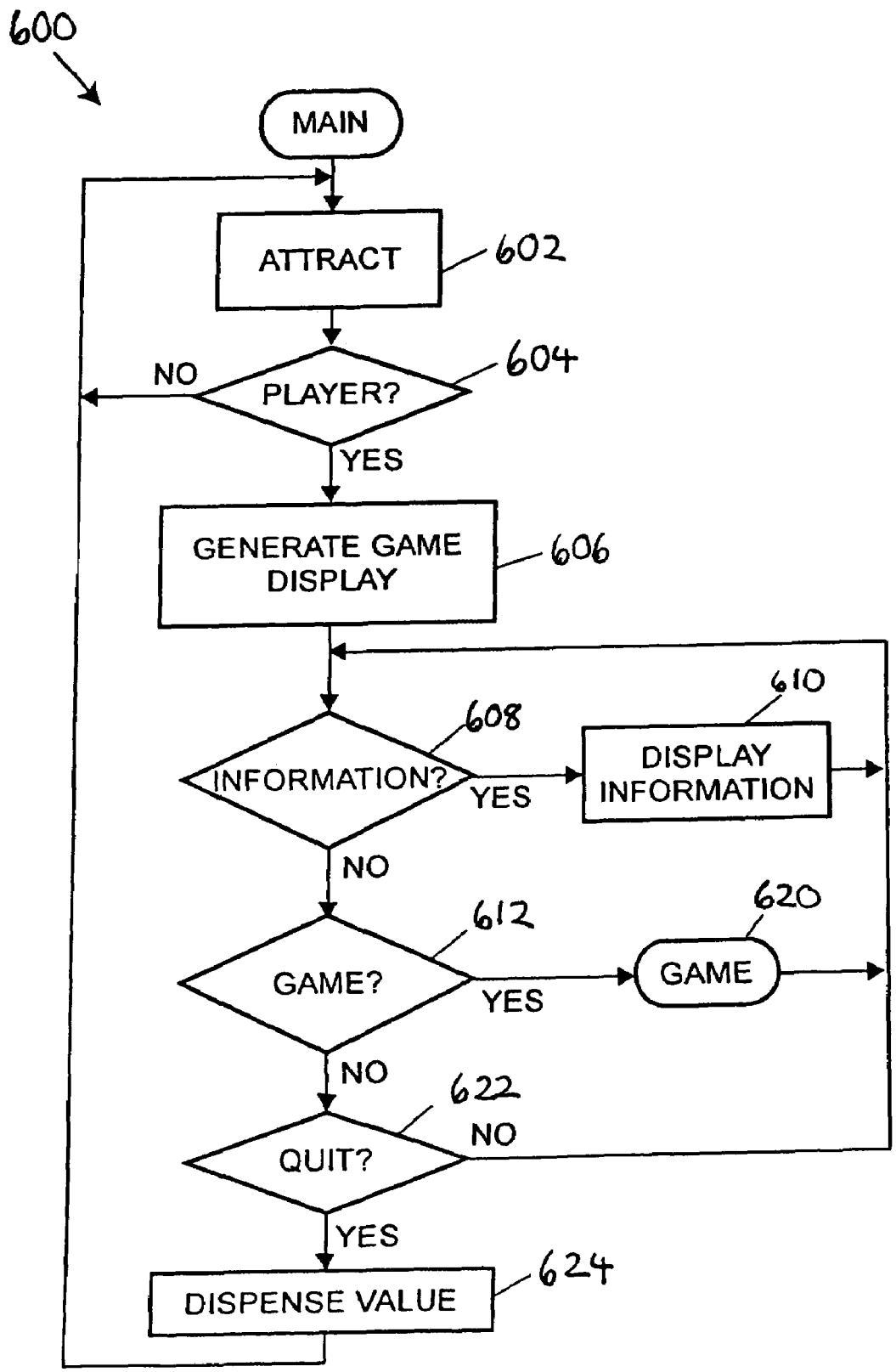
FIG. 14 is a flowchart of an alternative embodiment of a main routine that may be performed during operation of one or more of the gaming units.

FIG. 14 is a flowchart of an alternative main operating routine 600 that may be stored in the memory of the controller 100. The main routine 600 may be utilized for gaming units 20 that are designed to allow play of only a single game or single type of game. Referring to FIG. 14, the main routine 600 may begin operation at block 602 during which an attraction sequence may be performed in an attempt to induce a potential player in a casino to play the gaming unit 20. The attraction sequence may be performed by displaying one or more video images on the display unit 70 (if provided as a video display unit) and/or causing one or more sound segments, such as voice or music, to be generated via the speakers 62.

During performance of the attraction sequence, if a potential player makes any input to the gaming unit 20 as determined at block 604, the attraction sequence may be terminated and a game display may be generated on the display unit 70 (if provided as a video display unit) at block 606. The game display generated at block 606 may include, for example, an image of the casino game that may be played on the gaming unit 20 and/or a visual message to prompt the player to deposit value into the gaming unit 20. At block 608, the gaming unit 20 may determine if the player requested information concerning the game, in which case the requested information may be displayed at block 610. Block 612 may be used to determine if the player requested initiation of a game, in which case a game routine 620 may be performed. The game routine 620 could be any one of the game routines disclosed herein, such as one of the five game routines 510, 520, 530, 540, 550, or another game routine.

After the routine 620 has been performed to allow the player to play the game, block 622 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 624 based on the outcome of the game(s) played by the player. The operation may then return to block 602. If the player did not wish to quit as determined at block 622, the operation may return to block 608.

Figure 15:
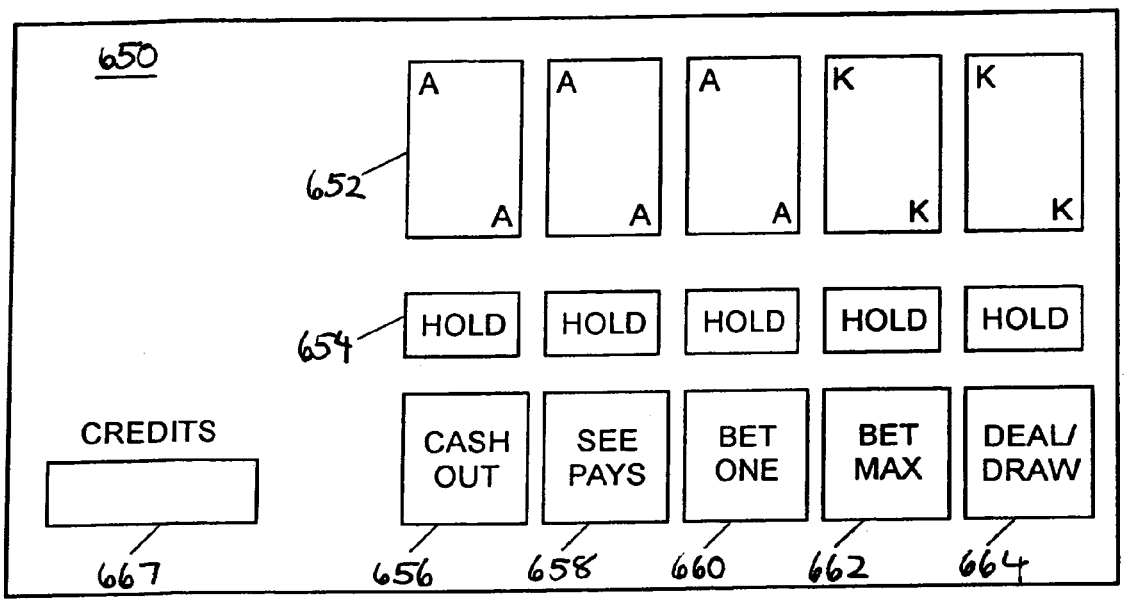
FIG. 15 is an illustration of an embodiment of a visual display that may be displayed during performance of the video poker routine of FIG. 17.

Video Poker

Where the gaming unit 20 is designed to facilitate play of a video poker game, the display unit 70 may comprise a video display unit. FIG. 15 is an exemplary display 650 that may be shown on the display unit 70 during performance of the video poker routine 510 shown schematically in FIG. 13. Referring to FIG. 15, the display 650 may include video images 652 of a plurality of playing cards representing the player's hand, such as five cards. To allow the player to control the play of the video poker game, a plurality of player-selectable buttons may be displayed. The buttons may include a "Hold" button 654 disposed directly below each of the playing card images 652, a "Cash Out" button 656, a "See Pays" button 658, a "Bet One Credit" button 660, a "Bet Max Credits" button 662, and a "Deal/Draw" button 664. The display 650 may also include an area 667 in which the number of remaining credits or value is displayed. If the display unit 70 is provided with a touch-sensitive screen, the buttons 654, 656, 658, 660, 662, 664 may form part of the video display 650. Alternatively, one or more of those buttons may be provided as part of a control panel that is provided separately from the display unit 70.

Figure 17:
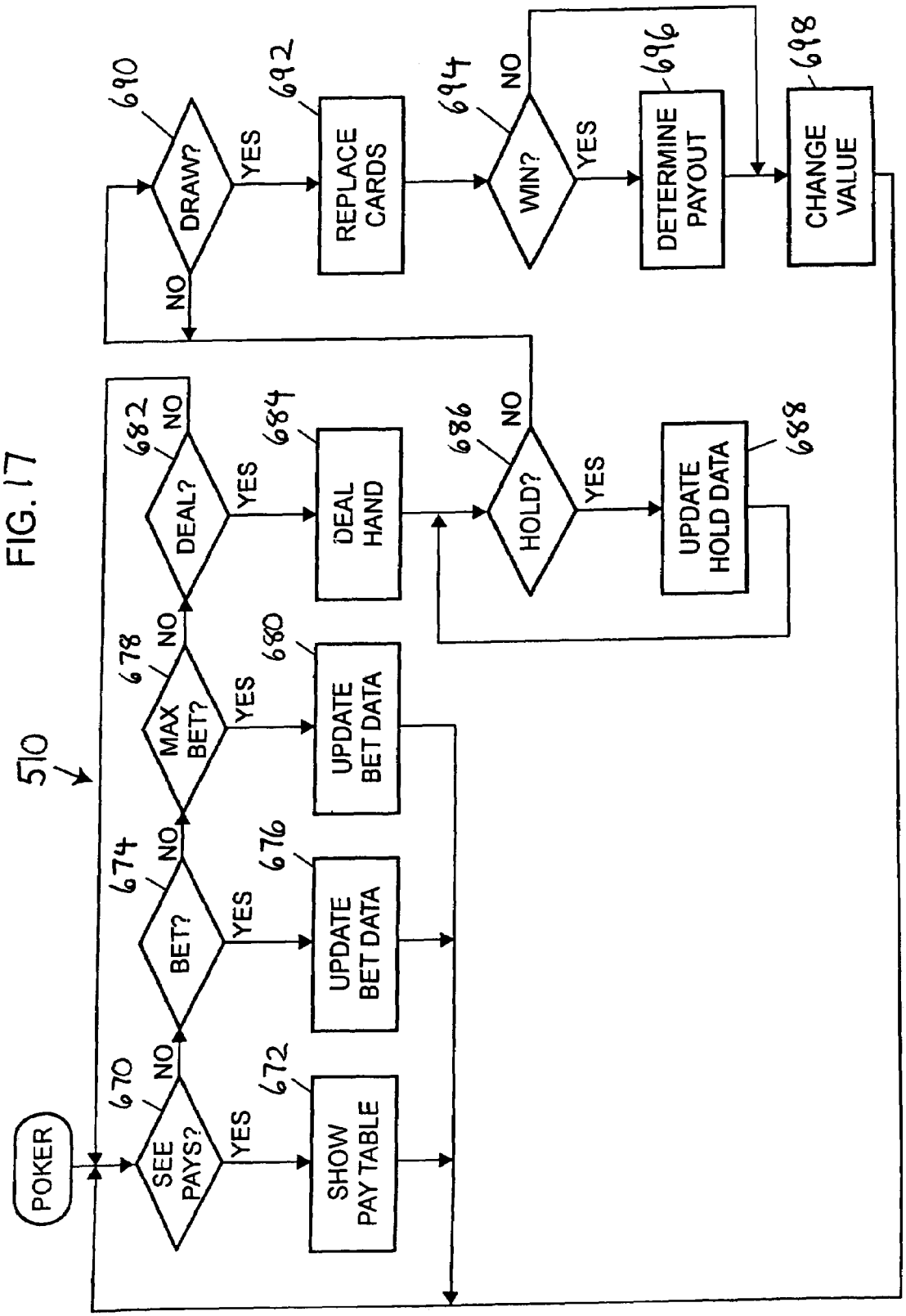
FIG. 17 is a flowchart of an embodiment of a video poker routine that may be performed by one or more of the gaming units.

FIG. 17 is a flowchart of the video poker routine 510 shown schematically in FIG. 13. Referring to FIG. 17, at block 670, the routine may determine whether the player has requested payout information, such as by activating the "See Pays" button 658, in which case at block 672 the routine may cause one or more pay tables to be displayed on the display unit 70. At block 674, the routine may determine whether the player has made a bet, such as by pressing the "Bet One Credit" button 660, in which case at block 676 bet data corresponding to the bet made by the player may be stored in the memory of the controller 100. At block 678, the routine may determine whether the player has pressed the "Bet Max Credits" button 662, in which case at block 680 bet data corresponding to the maximum allowable bet may be stored in the memory of the controller 100.

At block 682, the routine may determine if the player desires a new hand to be dealt, which may be determined by detecting if the "Deal/Draw" button 664 was activated after a wager was made. In that case, at block 684 a video poker hand may be "dealt" by causing the display unit 70 to generate the playing card images 652. After the hand is dealt, at block 686 the routine may determine if any of the "Hold" buttons 654 have been activated by the player, in which case data regarding which of the playing card images 652 are to be "held" may be stored in the controller 100 at block 688. If the "Deal/Draw" button 664 is activated again as determined at block 690, each of the playing card images 652 that was not "held" may be caused to disappear from the video display 650 and to be replaced by a new, randomly selected, playing card image 652 at block 692.

At block 694, the routine may determine whether the poker hand represented by the playing card images 652 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 696. At block 698, the player's cumulative value or number of credits may be updated by subtracting the bet made by the player and adding, if the hand was a winner, the payout value determined at block 696. The cumulative value or number of credits may also be displayed in the display area 667 (FIG. 15).

Although the video poker routine 510 is described above in connection with a single poker hand of five cards, the routine 510 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Figure 16:
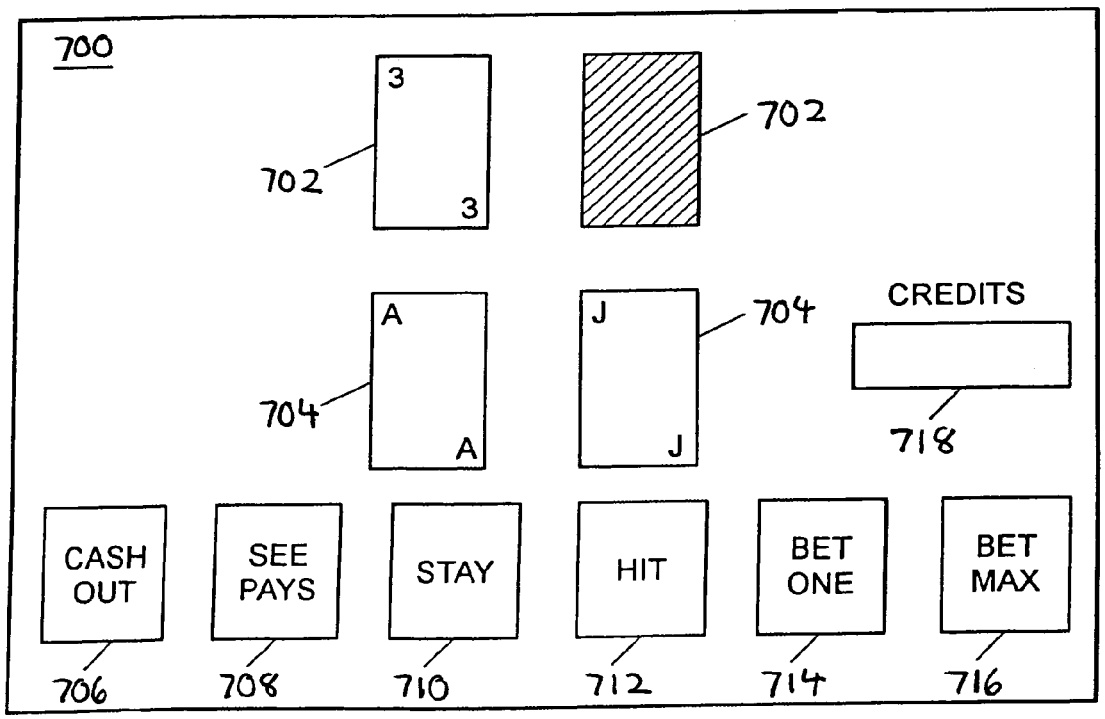
FIG. 16 is an illustration of an embodiment of a visual display that may be displayed during performance of the video blackjack routine of FIG. 18.

Video Blackjack

Where the gaming unit 20 is designed to facilitate play of a video blackjack game, the display unit 70 may comprise a video display unit. FIG. 16 is an exemplary display 700 that may be shown on the display unit 70 during performance of the video blackjack routine 520 shown schematically in FIG. 13. Referring to FIG. 16, the display 700 may include video images 702 of a pair of playing cards representing a dealer's hand, with one of the cards shown face up and the other card being shown face down, and video images 704 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 706, a "See Pays" button 708, a "Stay" button 710, a "Hit" button 712, a "Bet One Credit" button 714, and a "Bet Max Credits" button 716. The display 700 may also include an area 718 in which the number of remaining credits or value is displayed. If the display unit 70 is provided with a touch-sensitive screen, the buttons 706, 708, 710, 712, 714, 716 may form part of the video display 700. Alternatively, one or more of those buttons may be provided as part of a control panel that is provided separately from the display unit 70.

Figure 18:
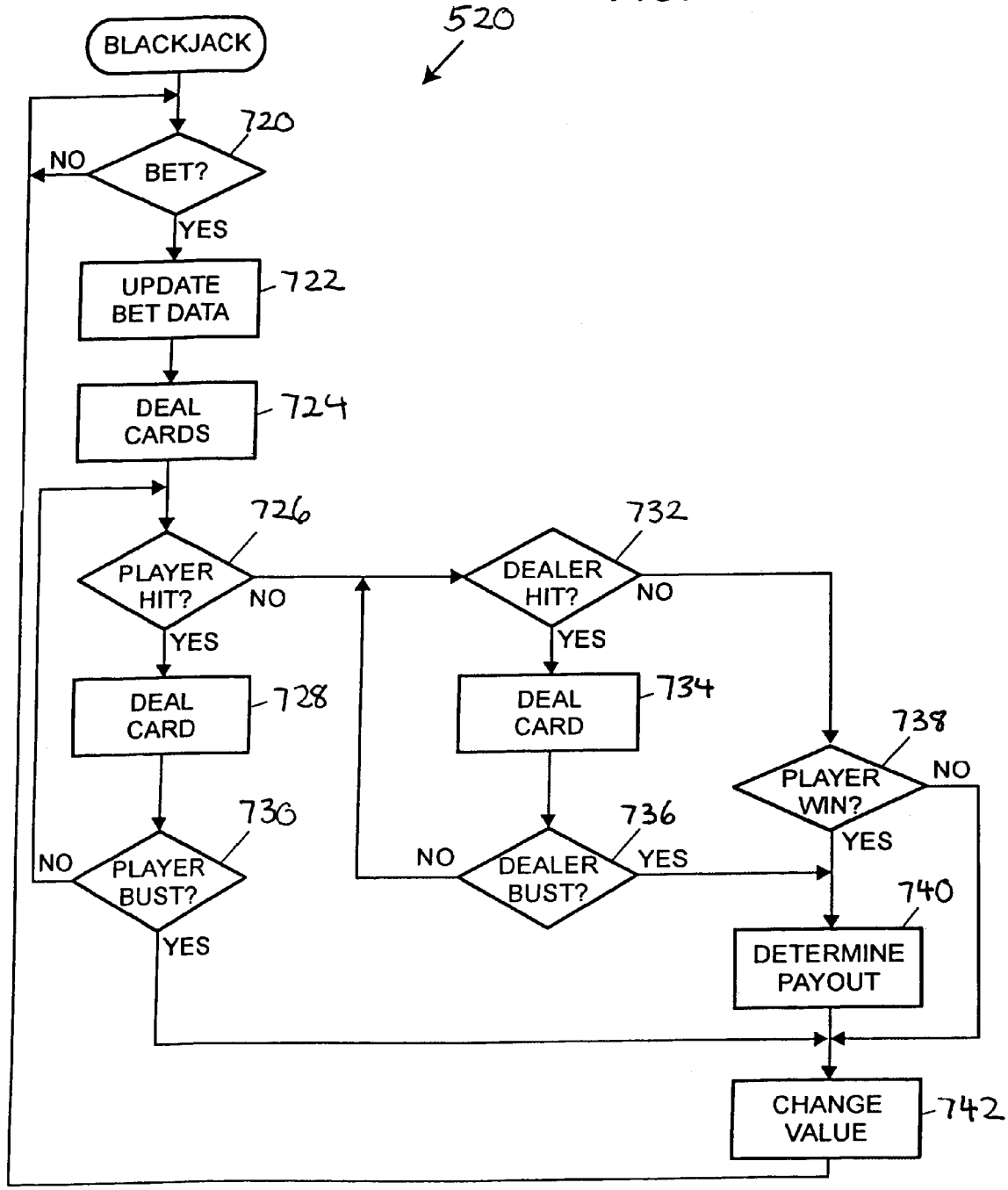
FIG. 18 is a flowchart of an embodiment of a video blackjack routine that may be performed by one or more of the gaming units.

FIG. 18 is a flowchart of the video blackjack routine 520 shown schematically in FIG. 13. Referring to FIG. 18, the video blackjack routine 520 may begin at block 720 where it may determine whether a bet has been made by the player. That may be determined, for example, by detecting the activation of either the "Bet One Credit" button 714 or the "Bet Max Credits" button 716. At block 722, bet data corresponding to the bet made at block 720 may be stored in the memory of the controller 100. At block 724, a dealer's hand and a player's hand may be "dealt" by making the playing card images 702, 704 appear on the display unit 70.

At block 726, the player may be allowed to be "hit," in which case at block 728 another card will be dealt to the player's hand by making another playing card image 704 appear in the display 700. If the player is hit, block 730 may determine if the player has "bust," or exceeded 21. If the player has not bust, blocks 726 and 728 may be performed again to allow the player to be hit again.

If the player decides not to hit, at block 732 the routine may determine whether the dealer should be hit. Whether the dealer hits may be determined in accordance with predetermined rules, such as the dealer always hit if the dealer's hand totals 15 or less. If the dealer hits, at block 734 the dealer's hand may be dealt another card by making another playing card image 702 appear in the display 700. At block 736 the routine may determine whether the dealer has bust. If the dealer has not bust, blocks 732, 734 may be performed again to allow the dealer to be hit again.

If the dealer does not hit, at block 736 the outcome of the blackjack game and a corresponding payout may be determined based on, for example, whether the player or the dealer has the higher hand that does not exceed 21. If the player has a winning hand, a payout value corresponding to the winning hand may be determined at block 740. At block 742, the player's cumulative value or number of credits may be updated by subtracting the bet made by the player and adding, if the player won, the payout value determined at block 740. The cumulative value or number of credits may also be displayed in the display area 718 (FIG. 16).

Figure 19:
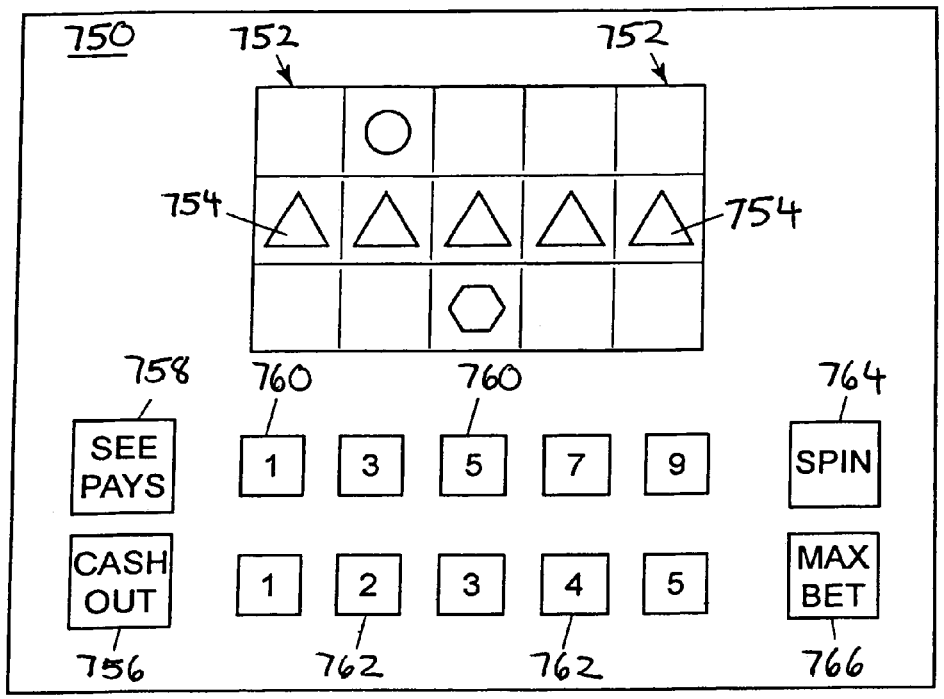
FIG. 19 is an illustration of an embodiment of a visual display that may be displayed during performance of the slots routine of FIG. 21.

Slots

Where the gaming unit 20 is designed to facilitate play of a video slots game, the display unit 70 may comprise a video display unit. FIG. 19 is an exemplary display 750 that may be shown on the display unit 70 during performance of the slots routine 530 shown schematically in FIG. 13. Referring to FIG. 19, the display 750 may include video images 752 of a plurality of slot machine reels, each of the reels having a plurality of reel symbols 754 associated therewith. Although the display 750 shows five reel images 752, each of which may have three reel symbols 754 that are visible at a time, other reel configurations could be utilized.

To allow the player to control the play of the slots game, a plurality of player-selectable buttons may be displayed. The buttons may include a "Cash Out" button 756, a "See Pays" button 758, a plurality of payline-selection buttons 760 each of which allows the player to select a different number of paylines prior to "spinning" the reels, a plurality of bet-selection buttons 762 each of which allows a player to specify a wager amount for each payline selected, a "Spin" button 764, and a "Max Bet" button 766 to allow a player to make the maximum wager allowable.

Figure 21:
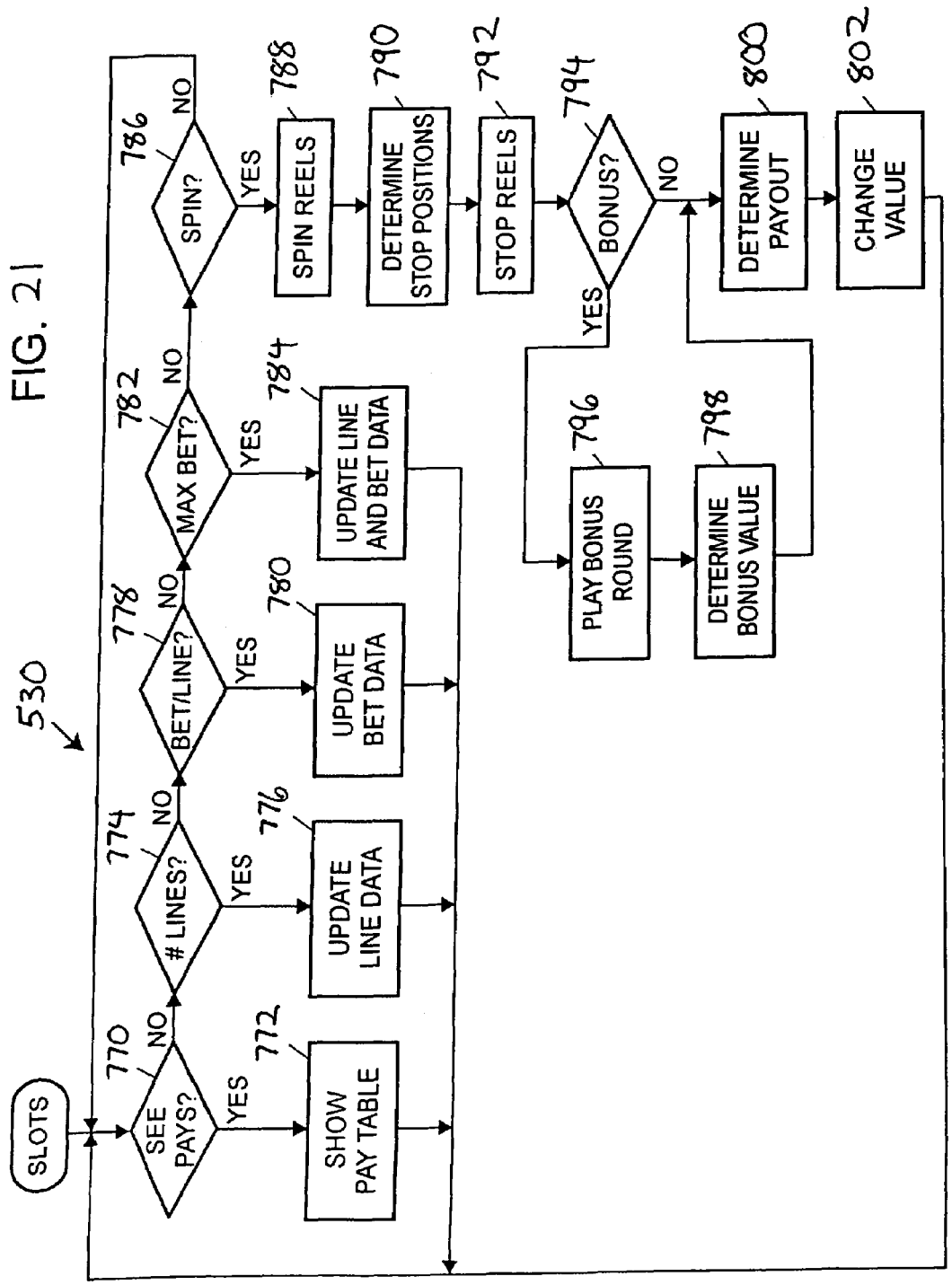
FIG. 21 is a flowchart of an embodiment of a slots routine that may be performed by one or more of the gaming units.

FIG. 21 is a flowchart of the slots routine 530 shown schematically in FIG. 19. Referring to FIG. 21, at block 770, the routine may determine whether the player has requested payout information, such as by activating the "See Pays" button 758, in which case at block 772 the routine may cause one or more pay tables to be displayed on the display unit 70. At block 774, the routine may determine whether the player has pressed one of the payline-selection buttons 760, in which case at block 776 data corresponding to the number of paylines selected by the player may be stored in the memory of the controller 100. At block 778, the routine may determine whether the player has pressed one of the bet-selection buttons 762, in which case at block 780 data corresponding to the amount bet per payline may be stored in the memory of the controller 100. At block 782, the routine may determine whether the player has pressed the "Max Bet" button 766, in which case at block 784 bet data (which may include both payline data and bet-per-payline data) corresponding to the maximum allowable bet may be stored in the memory of the controller 100.

If the "Spin" button 764 has been activated by the player as determined at block 786, at block 788 the routine may cause the slot machine reel images 752 to begin "spinning" so as to simulate the appearance of a plurality of spinning mechanical slot machine reels. At block 790, the routine may determine the positions at which the slot machine reel images will stop, or the particular symbol images 754 that will be displayed when the reel images 752 stop spinning. At block 792, the routine may stop the reel images 752 from spinning by displaying stationary reel images 752 and images of three symbols 754 for each stopped reel image 752. The virtual reels may be stopped from left to right, from the perspective of the player, or in any other manner or sequence.

The routine may provide for the possibility of a bonus game or round if certain conditions are met, such as the display in the stopped reel images 752 of a particular symbol 754. If there is such a bonus condition as determined at block 794, the routine may proceed to block 796 where a bonus round may be played. The bonus round may be a different game than slots, and many other types of bonus games could be provided. If the player wins the bonus round, or receives additional credits or points in the bonus round, a bonus value may be determined at block 798. A payout value corresponding to outcome of the slots game and/or the bonus round may be determined at block 800. At block 802, the player's cumulative value or number of credits may be updated by subtracting the bet made by the player and adding, if the slot game and/or bonus round was a winner, the payout value determined at block 800.

Although the above routine has been described as a virtual slot machine routine in which slot machine reels are represented as images on the display unit 70, actual slot machine reels that are capable of being spun may be utilized instead, in which case the display unit 70 could be provided in the form of a plurality of mechanical reels that are rotatable, each of the reels having a plurality of reel images disposed thereon.

Figure 20:
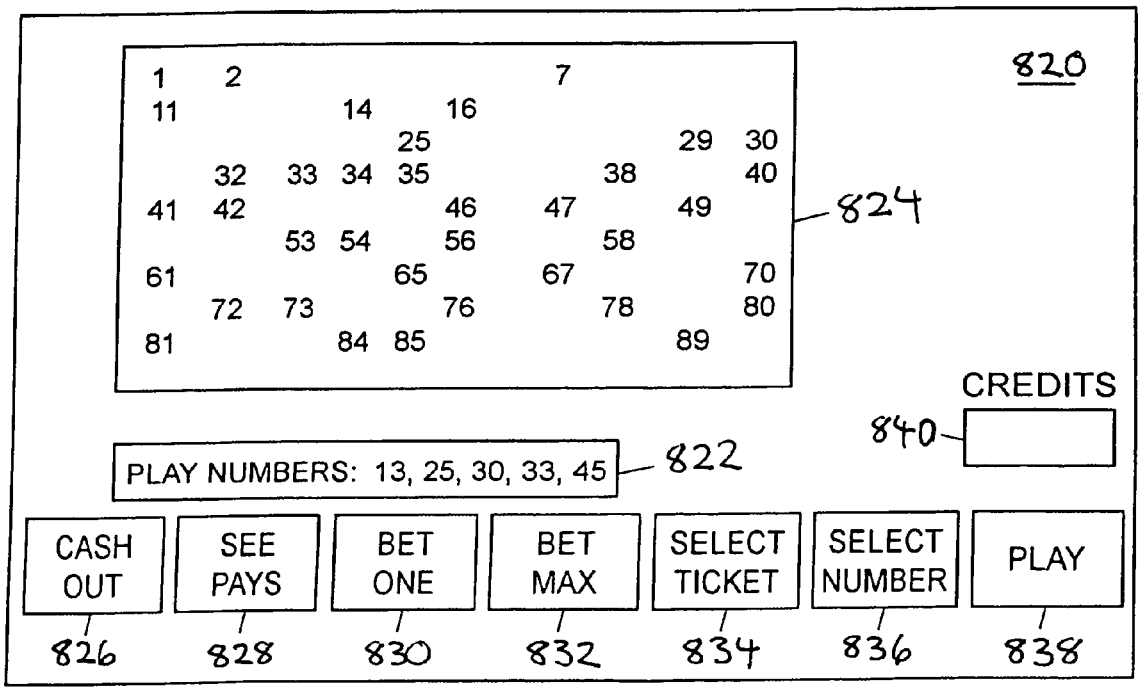
FIG. 20 is an illustration of an embodiment of a visual display that may be displayed during performance of the video keno routine of FIG. 22.

Video Keno

Where the gaming unit 20 is designed to facilitate play of a video keno game, the display unit 70 may comprise a video display unit. FIG. 20 is an exemplary display 820 that may be shown on the display unit 70 during performance of the video keno routine 540 shown schematically in FIG. 13. Referring to FIG. 20, the display 820 may include a video image 822 of a plurality of numbers that were selected by the player prior to the start of a keno game and a video image 824 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 826, a "See Pays" button 828, a "Bet One Credit" button 830, a "Bet Max Credits" button 832, a "Select Ticket" button 834, a "Select Number" button 836, and a "Play" button 838. The display 820 may also include an area 840 in which the number of remaining credits or value is displayed. If the display unit 70 is provided with a touch-sensitive screen, the buttons may form part of the video display 820. Alternatively, one or more of those buttons may be provided as part of a control panel that is provided separately from the display unit 70.

Figure 22:
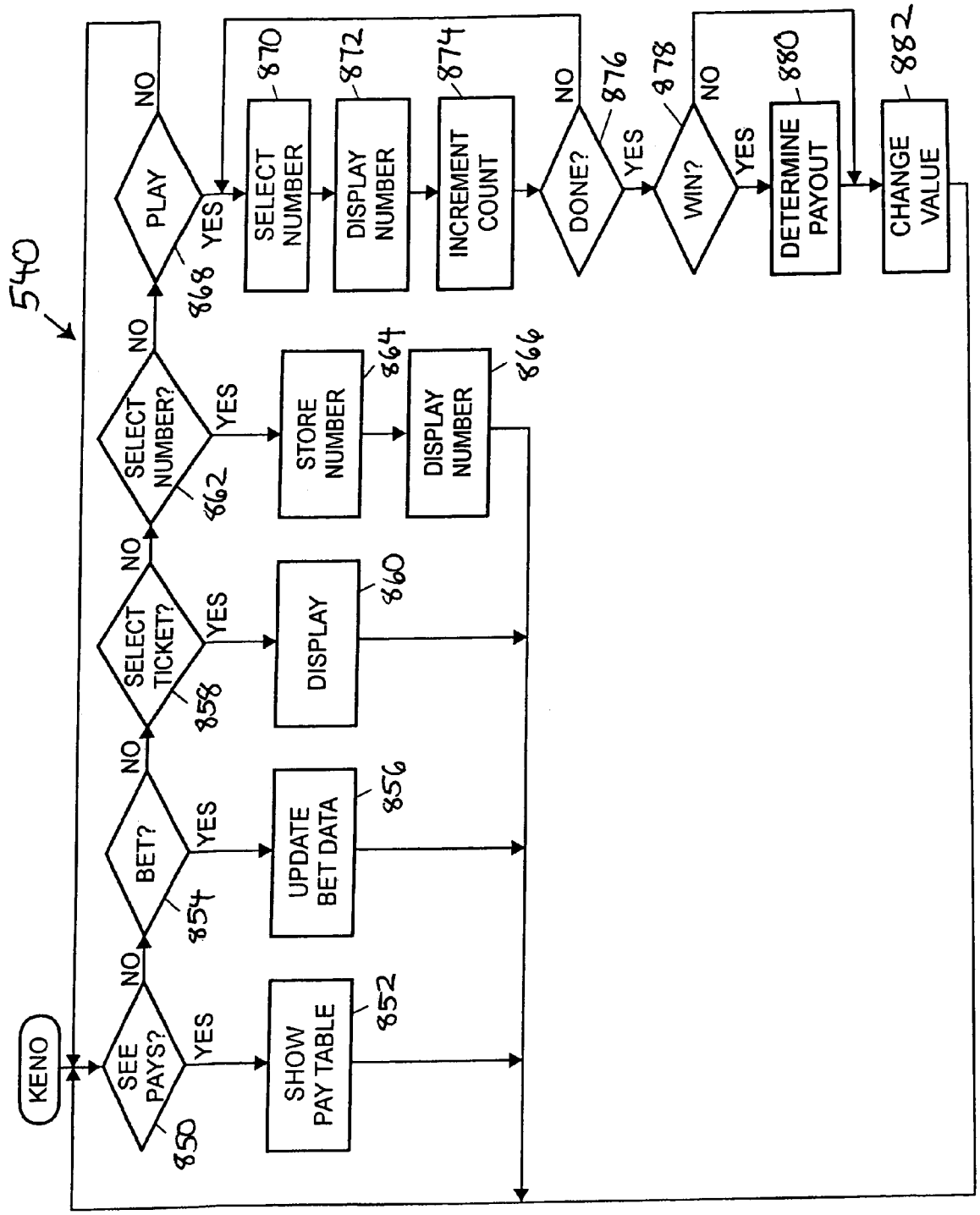
FIG. 22 is a flowchart of an embodiment of a video keno routine that may be performed by one or more of the gaming units.

FIG. 22 is a flowchart of the video keno routine 540 shown schematically in FIG. 13. The keno routine 540 may be utilized in connection with a single gaming unit 20 where a single player is playing a keno game, or the keno routine 540 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 22, at block 850, the routine may determine whether the player has requested payout information, such as by activating the "See Pays" button 828, in which case at block 852 the routine may cause one or more pay tables to be displayed on the display unit 70. At block 854, the routine may determine whether the player has made a bet, such as by having pressed the "Bet One Credit" button 830 or the "Bet Max Credits" button 832, in which case at block 856 bet data corresponding to the bet made by the player may be stored in the memory of the controller 100. After the player has made a wager, at block 858 the player may select a keno ticket, and at block 860 the ticket may be displayed on the display 820. At block 862, the player may select one or more game numbers, which may be within a range set by the casino. After being selected, the player's game numbers may be stored in the memory of the controller 100 at block 864 and may be included in the image 822 on the display 820 at block 866. After a certain amount of time, the keno game may be closed to additional players (where a number of players are playing a single keno game using multiple gambling units 20).

If play of the keno game is to begin as determined at block 868, at block 870 a game number within a range set by the casino may be randomly selected either by the controller 100 or a central computer operatively connected to the controller, such as one of the network computers 22, 32. At block 872, the randomly selected game number may be displayed on the display unit 70 and the display units 70 of other gaming units 20 (if any) which are involved in the same keno game. At block 874, the controller 100 (or the central computer noted above) may increment a count which keeps track of how many game numbers have been selected at block 870.

At block 876, the controller 100 (or one of the network computers 22, 32) may determine whether a maximum number of game numbers within the range have been randomly selected. If not, another game number may be randomly selected at block 870. If the maximum number of game numbers has been selected, at block 878 the controller 100 (or a central computer) may determine whether there are a sufficient number of matches between the game numbers selected by the player and the game numbers selected at block 870 to cause the player to win. The number of matches may depend on how many numbers the player selected and the particular keno rules being used.

If there are a sufficient number of matches, a payout may be determined at block 880 to compensate the player for winning the game. The payout may depend on the number of matches between the game numbers selected by the player and the game numbers randomly selected at block 870. At block 882, the player's cumulative value or number of credits may be updated by subtracting the bet made by the player and adding, if the keno game was won, the payout value determined at block 880. The cumulative value or number of credits may also be displayed in the display area 840 (FIG. 20).

Figure 23:
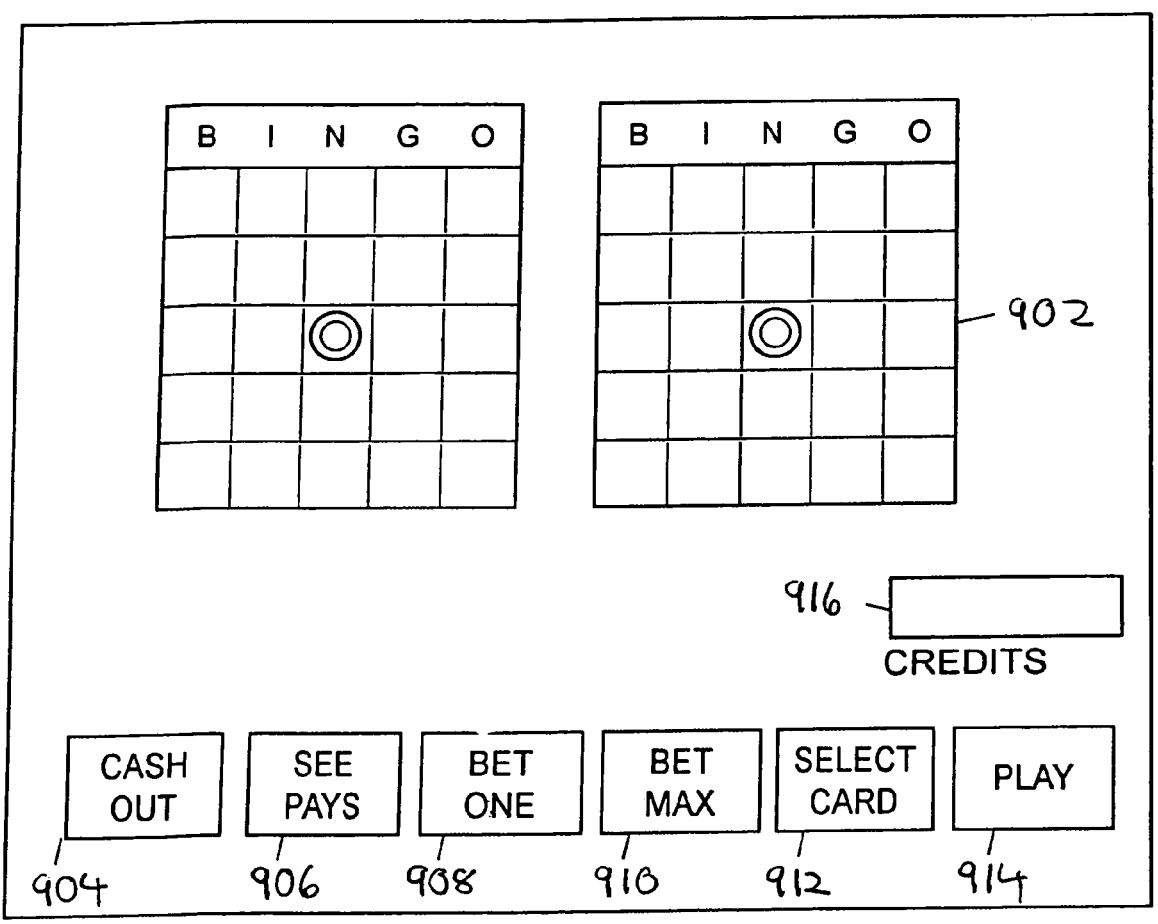
FIG. 23 is an illustration of an embodiment of a visual display that may be displayed during performance of the video bingo routine of FIG. 24.

Video Bingo

Where the gaming unit 20 is designed to facilitate play of a video bingo game, the display unit 70 may comprise a video display unit. FIG. 23 is an exemplary display 900 that may be shown on the display unit 70 during performance of the video bingo routine 550 shown schematically in FIG. 13. Referring to FIG. 23, the display 900 may include one or more video images 902 of a bingo card and images of the bingo numbers selected during the game. The bingo card images 902 may have a grid pattern.

To allow the player to control the play of the bingo game, a plurality of player-selectable buttons may be displayed. The buttons may include a "Cash Out" button 904, a "See Pays" button 906, a "Bet One Credit" button 908, a "Bet Max Credits" button 910, a "Select Card" button 912, and a "Play" button 914. The display 900 may also include an area 916 in which the number of remaining credits or value is displayed. If the display unit 70 is provided with a touch-sensitive screen, the buttons may form part of the video display 900. Alternatively, one or more of those buttons may be provided as part of a control panel that is provided separately from the display unit 70.

Figure 24:
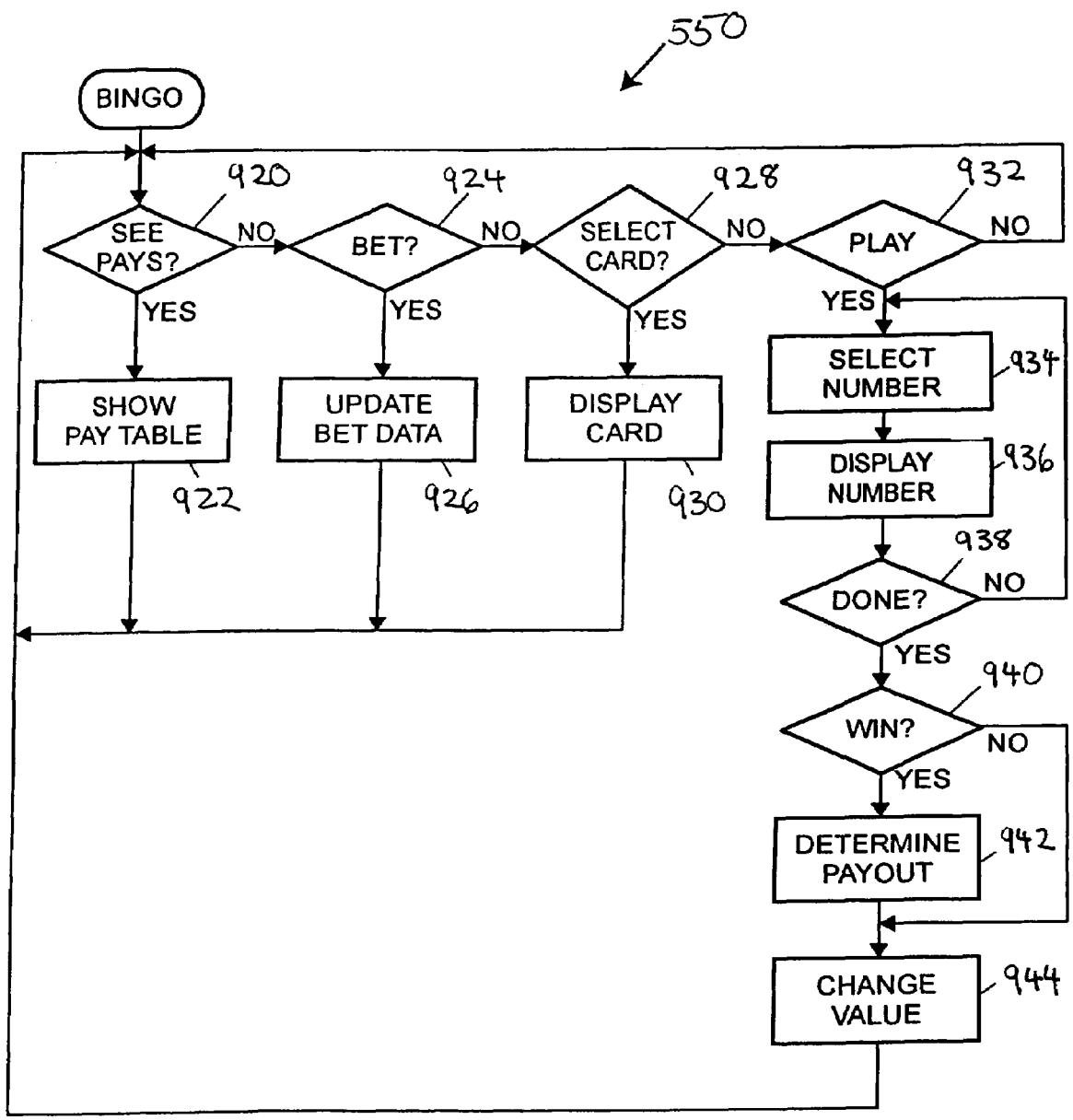
FIG. 24 is a flowchart of an embodiment of a video bingo routine that may be performed by one or more of the gaming units.

FIG. 24 is a flowchart of the video bingo routine 550 shown schematically in FIG. 13. The bingo routine 550 may be utilized in connection with a single gaming unit 20 where a single player is playing a bingo game, or the bingo routine 550 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 24, at block 920, the routine may determine whether the player has requested payout information, such as by activating the "See Pays" button 906, in which case at block 922 the routine may cause one or more pay tables to be displayed on the display unit 70. At block 924, the routine may determine whether the player has made a bet, such as by having pressed the "Bet One Credit" button 908 or the "Bet Max Credits" button 910, in which case at block 926 bet data corresponding to the bet made by the player may be stored in the memory of the controller 100.

After the player has made a wager, at block 928 the player may select a bingo card, which may be generated randomly. The player may select more than one bingo card, and there may be a maximum number of bingo cards that a player may select. After play is to commence as determined at block 932, at block 934 a bingo number may be randomly generated by the controller 100 or a central computer such as one of the network computers 22, 32. At block 936, the bingo number may be displayed on the display unit 70 and the display units 70 of any other gaming units 20 involved in the bingo game.

At block 938, the controller 100 (or a central computer) may determine whether any player has won the bingo game. If no player has won, another bingo number may be randomly selected at block 934. If any player has bingo as determined at block 938, the routine may determine at block 940 whether the player playing that gaming unit 20 was the winner. If so, at block 942 a payout for the player may be determined. The payout may depend on the number of random numbers that were drawn before there was a winner, the total number of winners (if there was more than one player), and the amount of money that was wagered on the game. At block 944, the player's cumulative value or number of credits may be updated by subtracting the bet made by the player and adding, if the bingo game was won, the payout value determined at block 942. The cumulative value or number of credits may also be displayed in the display area 916 (FIG. 23).

What is claimed is:

1. A method for configuring a first gaming system to send or receive formatted data, the formatted data including a plurality of formatting tags, the method comprising:
   receiving by the first computing device via a network, an indication of a set of formatting tags including a set of formatting tags recognized by a second computing device;
   determining by the first computing device, based on the set of formatting tags received via the network, a first mapping in response to the receiving of the indication, the first mapping comprising a mapping of identifiers to formatting tags in the set of formatting tags;
   configuring by the first computing device at least one of an encoder, a decoder, and a parser of the first computing device with the first mapping, thereby allowing the first computing device to send or receive formatted data in accordance with the set of formatting tags recognized by the second computing device without interfering with the gaming operations of the first gaming apparatus;
   transmitting to the second device an indication of the first mapping;
   identifying formatting tags from formatted data to be sent to the second computing device; and
   replacing each identified formatting tag in the formatted data to be sent based on the first mapping with a corresponding identifier indicative of the formatting tag.

2. A method as defined in claim 1, wherein determining the first mapping comprises generating the first mapping in response to receiving the indication of the set of formatting tags recognized by the second computing device.

3. A method as defined in claim 1, wherein determining the first mapping comprises selecting the first mapping from a set of mappings.

4. A method as defined in claim 3, wherein the set of mappings comprises one mapping.

5. A method as defined in claim 1, wherein determining the first mapping comprises determining a mapping between an Extensible Markup Language (XML) tag and a first identifier.

6. A method as defined in claim 5, wherein determining the first mapping comprises determining a mapping between an Extensible Markup Language (XML) attribute and a second identifier.

7. A method as defined in claim 1, further comprising determining a second mapping, the second mapping comprising a mapping of identifiers to an encrypted versions of formatting tags corresponding to the set of formatting tags;
   wherein determining the first mapping comprises determining the first mapping based on the second mapping.

8. A method as defined in claim 1, wherein receiving the indication of the set of formatting tags comprises at least one of:
   receiving an identifier of the set of formatting tags;
   receiving a set of encrypted versions of formatting tags in the set of formatting tags; and
   receiving an identifier of a set of encrypted versions of formatting tags in the set of formatting tags.

9. A method as defined in claim 1, wherein transmitting to the second computing device the indication of the first mapping comprises at least one of:
   transmitting the first mapping;
   transmitting an identifier of the first mapping;
   transmitting a second mapping, the second mapping comprising a mapping of identifiers to encrypted versions of the formatting tags in the set of formatting tags; and
   transmitting an identifier of the second mapping.

10. A method as defined in claim 9, further comprising determining the second mapping.

11. A method as defined in claim 1, further comprising:
   identifying formatting tags from the set of formatting tags in formatted data to be sent to the second computing device; and
   replacing each identified formatting tag in the formatted data to be sent with a corresponding identifier indicative of the formatting tag.

12. A method as defined in claim 1, further comprising:
   identifying identifiers in formatted data received from the second computing device via the network; and
   replacing each identified identifier in the received formatted data with a corresponding formatting tag.

13. A method as defined in claim 1, further comprising:
   identifying identifiers in formatted data received from the second computing device via the network; and
   parsing the received formatted data based on the identified identifiers.

14. A method for setting up a communication of formatted data between a first computing device and a second computing device, the formatted data including a plurality of formatting tags, the method comprising:
   receiving via a network an indication of a set of encrypted versions of formatting tags recognized by the second computing device;
   determining by the first computing device a first mapping, the first mapping comprising a mapping of identifiers to formatting tags corresponding to the set of encrypted versions of formatting tags recognized by the second computing device;
   configuring at least one of an encoder, a decoder, and a parser of the first computing device with the first mapping;
   transmitting to the second computing device an indication of the first mapping;
   identifying formatting tags from formatted data to be sent to the second computing device; and
   replacing each identified formatting tag in the formatted data to be sent based on the mapping with a corresponding identifier indicative of the formatting tag.

15. A method as defined in claim 14, wherein determining the first mapping comprises generating the first mapping in response to receiving the indication of the set of encrypted versions of formatting tags recognized by the second computing device.

16. A method as defined in claim 14, wherein determining the first mapping comprises selecting the first mapping from a set of mappings.

17. A method as defined in claim 14, wherein the set of mappings comprises one mapping.

18. A method as defined in claim 14, wherein determining the first mapping comprises determining a mapping between an Extensible Markup Language (XML) tag and a first identifier.

19. A method as defined in claim 18, wherein determining the first mapping comprises determining a mapping between an Extensible Markup Language (XML) attribute and a second identifier.

20. A method as defined in claim 14, further comprising determining a second mapping, the second mapping comprising a mapping of identifiers to encrypted versions of formatting tags in the set.

21. A method as defined in claim 14, wherein transmitting to the second computing device the indication of the first mapping comprises at least one of:

transmitting the first mapping;
transmitting an identifier of the first mapping;
transmitting a second mapping, the second mapping comprising a mapping of identifiers to encrypted versions of formatting tags in the set; and
transmitting an identifier of the second mapping.

22. A method as defined in claim 21, wherein determining the first mapping comprises determining the first mapping based on the second mapping.

23. A gaming system apparatus, comprising:
a network interface device to communicatively couple to a plurality of gaming machines via a communication link;
a controller operatively coupled to the network interface device, the controller comprising:
a processor;
a memory operatively coupled to the processor;
a negotiator to receive via the communication link an indication of a set of formatting tags recognized by a computing device separate from the gaming apparatus;
a mapping determiner to determine a mapping of identifiers to formatting tags in the set of formatting tags;
at least one of an encoder capable of being configured to encode formatted data based on the mapping, a decoder capable of being configured to decode encoded formatted data based on the mapping, and a parser capable of being configured to parse encoded formatted data based on the mapping; and
wherein the negotiator is configured to send to the separate computing device, via the network interface device, an indication of the mapping, and wherein formatting tags from formatted data to be sent to the separate computing device are identified and replaced with corresponding identifiers according to the mapping.

24. The gaming apparatus as defined in claim 23, wherein the controller is programmed to implement the negotiator.

25. A gaming apparatus as defined in claim 23, wherein the controller is programmed to implement the mapping determiner.

26. A gaming system apparatus, comprising:
a network interface device to communicatively couple to a plurality of gaming machines via a communication link;
a controller operatively coupled to the network interface device, the controller comprising:
a processor;
a memory operatively coupled to the processor;
a negotiator to receive via the communication link a set of encrypted versions of formatting tags recognized by a computing device separate from the gaming apparatus;
a mapping determiner to determine a first mapping based on the set of encrypted versions of formatting tags recognized by the separate computing device, the first mapping comprising a mapping of identifiers to formatting tags corresponding to the set of encrypted versions of formatting tags; and
at least one of an encoder capable of being configured to encode formatted data based on the first mapping, a decoder capable of being configured to decode encoded formatted data based on the first mapping, and a parser capable of being configured to parse encoded formatted data based on the first mapping;
wherein the mapping determiner is configured to determine a second mapping comprising a mapping of identifiers to encrypted versions of formatting tags in the set of encrypted versions of formatting tags; and
wherein the negotiator is configured to send to the separate computing device, via the network interface device, an indication of the second mapping, and wherein formatting tags from formatted data to be sent to the separate computing device are identified and replaced with corresponding identifiers according to the mapping.

27. A gaming apparatus as defined in claim 26, wherein the controller is programmed to implement the negotiator.

28. A gaming apparatus as defined in claim 26, wherein the controller is programmed to implement the mapping determiner.

29. A gaming apparatus as defined in claim 26, wherein a controller is programmed to implement the negotiator.

30. A gaming apparatus as defined in claim 26, wherein the controller is programmed to implement the at least one of the encoder, the decoder, and the parser.

31. A method for configuring a first computing device to send or receive formatted data, the formatted data including a plurality of formatting tags, the method comprising:
transmitting to a second computing device via a network an indication of a set of formatting tags recognized by the first computing device;
determining a first mapping, the first mapping comprising a mapping of identifiers to formatting tags in the set of formatting tags; and
configuring at least one of an encoder and a decoder of the first computing device with the first mapping, the encoder identifying formatting tags from formatted data to be sent to the second computing device: and replacing each identified formatting tag in the formatted data to be sent based on the first mapping with a corresponding identifier indicative of the formatting tag.

32. A method as defined in claim 31, wherein the first mapping comprises a mapping between an Extensible Markup Language (XML) tag and a first identifier.

33. A method as defined in claim 32, wherein the first mapping comprises a mapping between an Extensible Markup anguage (XML) attribute and a second identifier.

34. A method as defined in claim 31, further comprising receiving via the network an indication of the first mapping;
wherein determining the first mapping comprises determining the first mapping based on the indication of the first mapping.

35. A method as defined in claim 31, wherein transmitting to the second computing device the indication of the set of formatting tags recognized by the first computing device comprises at least one of:
transmitting the set of formatting tags;
transmitting an identifier of the set of formatting tags;
transmitting a set of encrypted versions of formatting tags in the set of formatting tags; and
transmitting an identifier of the set of encrypted versions of formatting tags in the set of formatting tags.

36. A method as defined in claim 34, wherein receiving the indication of the first mapping comprises at least one of:
receiving the first mapping;
receiving an identifier of the first mapping;
receiving a second mapping, the second mapping comprising a mapping of identifiers to an encrypted versions of the formatting tags in the set of formatting tags; and
receiving an identifier of the second mapping.

37. A method as defined in claim 36, wherein determining the first mapping comprises determining the first mapping based on the second mapping.

38. A method for setting up a communication of formatted data between a first computing device and a second computing device, the formatted data including a plurality of formatting tags, the method comprising:

transmitting via a network an indication of a set of encrypted versions of formatting tags recognized by the first computing device;

determining a first mapping, the first mapping comprising a mapping of identifiers to formatting tags corresponding to the set of encrypted versions of formatting tags; and configuring at least one of an encoder and a decoder of the first computing device with the first mapping, the encoder identifying formatting tags from formatted data to be sent via the network and replacing each identified formatting tag in the formatted data based on the first mapping with a corresponding identifier indicative of the formatting tag.

39. A method as defined in claim 38, wherein the first mapping comprises a mapping between an encrypted version of an Extensible Markup Language (XML) tag and a first identifier.

40. A method as defined in claim 38, wherein the first mapping comprises a mapping between an encrypted version of an Extensible Markup Language (XML) attribute and a second identifier.

41. A method as defined in claim 38, further comprising receiving via the network an indication of the first mapping;

wherein determining the first mapping comprises determining the first mapping based on the indication of the first mapping.

42. A method as defined in claim 41, wherein receiving the indication of the first mapping comprises at least one of:
receiving the first mapping;
receiving an identifier of the first mapping;
receiving a second mapping, the second mapping comprising a mapping of identifiers to the encrypted versions of the formatting tags in the set of formatting tags; and
receiving an identifier of the second mapping.

43. A method as defined in claim 42, wherein determining the first mapping comprises determining the first mapping based on the second mapping.

44. A method as defined in claim 38, wherein transmitting via the network the indication of the set of formatting tags recognized by the first computing device comprises at least one of:
transmitting the set of formatting tags;
transmitting an identifier of the set of formatting tags;
transmitting a set of encrypted versions of formatting tags in the set of formatting tags; and
transmitting an identifier of the set of encrypted versions of formatting tags in the set of formatting tags.

45. A computer readable medium for performing the method recited in claim 1.

46. A computer readable medium for performing the method recited in claim 31.

* * * * *

UNITED STATES PATENT AND TRADEMARK OFFICE
CERTIFICATE OF CORRECTION

| | | |
|---|---|---|
| PATENT NO. | : 7,480,857 B2 | Page 1 of 1 |
| APPLICATION NO. | : 10/938293 | |
| DATED | : January 20, 2009 | |
| INVENTOR(S) | : Jamal Benbrahim et al. | |

It is certified that error appears in the above-identified patent and that said Letters Patent is hereby corrected as shown below:

In the Claims:

In claim 14 (column 28, line 29) change "conesponding" to --corresponding--.

In claim 14 (column 28, line 41) change "conesponding" to --corresponding--.

In claim 24 (column 29, line 34) change "The gaming apparatus—" to --A gaming apparatus--.

In claim 26 (column 29, line 54) delete "and".

In claim 33 (column 30, line 36) delete "anguage" and add "Language".

In claim 38 (column 31, line 5) change "conesponding" to --corresponding--.

In claim 38 (column 31, line 12) change "conesponding" to --corresponding--.

Signed and Sealed this
Fourteenth Day of June, 2011

David J. Kappos
*Director of the United States Patent and Trademark Office*